(12) United States Patent
Bollmann

(10) Patent No.: US 8,967,668 B2
(45) Date of Patent: Mar. 3, 2015

(54) CONTAINER FOR RECEIVING AND CARRYING ELONGATE OBJECTS

(71) Applicant: Grace Guy Bollmann, Munich (DE)

(72) Inventor: Grace Guy Bollmann, Munich (DE)

( * ) Notice: Subject to any disclaimer, the term of this patent is extended or adjusted under 35 U.S.C. 154(b) by 0 days.

(21) Appl. No.: 13/796,507

(22) Filed: Mar. 12, 2013

(65) Prior Publication Data

US 2013/0292931 A1 Nov. 7, 2013

(30) Foreign Application Priority Data

Mar. 12, 2012 (DE) .......................... 10 2012 203 838
Apr. 18, 2012 (DE) ..................... 20 2012 003 974 U

(51) Int. Cl.
*B62B 9/26* (2006.01)
*B60R 9/00* (2006.01)
*B62B 3/10* (2006.01)

(52) U.S. Cl.
CPC ... *B60R 9/00* (2013.01); *B62B 9/26* (2013.01); *B62B 3/102* (2013.01)
USPC ............................ 280/769; 224/409; 224/485

(58) Field of Classification Search
CPC .............. B62B 9/10; B62B 9/12; B62B 9/26; B62B 9/147; B62B 3/102; B62B 5/0003; B60R 9/00; B60R 7/085; B60R 7/12; A45B 25/24; A45B 15/00; A45F 5/00; A47G 25/12; A01K 97/08; A01K 97/10; A01G 5/00; A45C 3/04
USPC .......... 280/769; 135/34.2; 224/400, 401, 407, 224/409, 411, 484, 485, 915, 581; 383/2, 383/36; 47/41.01, 41.13, 65.8; 206/423, 206/443
See application file for complete search history.

(56) References Cited

U.S. PATENT DOCUMENTS

| | | | | |
|---|---|---|---|---|
| 806,476 | A * | 12/1905 | Leibenglick | 224/547 |
| 1,823,648 | A * | 9/1931 | Dunn | 211/63 |
| 1,892,602 | A * | 12/1932 | Beehler | 224/275 |
| 1,904,510 | A * | 4/1933 | Mott | 135/34.2 |
| 2,384,285 | A * | 9/1945 | Deutsch | 2/17 |
| 2,533,725 | A * | 12/1950 | Eisenberg | 211/63 |
| 2,716,994 | A * | 9/1955 | Torricelli | 135/34.2 |
| 2,723,482 | A * | 11/1955 | Marten | 43/26 |
| 3,708,005 | A * | 1/1973 | Crain | 206/292 |

(Continued)

FOREIGN PATENT DOCUMENTS

| | | | | |
|---|---|---|---|---|
| AT | | 152457 B | 2/1938 | |
| DE | | 3524855 A1 * | 12/1985 | ............. A45B 25/24 |

(Continued)

OTHER PUBLICATIONS

JL Childress—Stroller side-sling cargo net; from Walmart.com, archive dated Jan. 31, 2010.*

(Continued)

*Primary Examiner* — J. Allen Shriver, II
*Assistant Examiner* — Steve Clemmons
(74) *Attorney, Agent, or Firm* — Muncy, Geissler, Olds & Lowe, P.C.

(57) ABSTRACT

A container having substantially the shape of a cornet for receiving and carrying elongate objects, the container includes a container cladding having an inner surface and an outer surface, a first container opening on one end of the container cladding, and one or more mounting elements for mounting the container to a stroller, the mounting elements being arranged at a portion of the outer surface of the container.

15 Claims, 25 Drawing Sheets

(56) References Cited

U.S. PATENT DOCUMENTS

| | | | | |
|---|---|---|---|---|
| 4,153,146 | A | * | 5/1979 | Patton et al. ............... 190/103 |
| 4,248,443 | A | * | 2/1981 | Ohlson ............................ 280/39 |
| 4,260,088 | A | * | 4/1981 | Buckner ....................... 224/609 |
| 4,426,113 | A | * | 1/1984 | Schutz ..................... 297/440.11 |
| D290,309 | S | * | 6/1987 | Welch ........................... D12/416 |
| 4,726,141 | A | * | 2/1988 | McBride et al. ................. 43/26 |
| 4,792,073 | A | * | 12/1988 | Jacober ........................ 224/614 |
| 5,071,046 | A | | 12/1991 | Miller |
| 5,154,331 | A | * | 10/1992 | Sanders ....................... 224/407 |
| 5,417,354 | A | * | 5/1995 | Jones ........................... 224/613 |
| 5,515,641 | A | * | 5/1996 | D'Alessandro .................. 43/26 |
| 5,564,539 | A | * | 10/1996 | Duensing ..................... 190/107 |
| 5,692,660 | A | * | 12/1997 | Stewart ........................ 224/581 |
| 5,887,711 | A | * | 3/1999 | McAuliffe ................... 206/292 |
| 5,961,015 | A | * | 10/1999 | Shirakawa .................... 224/442 |
| 6,015,077 | A | * | 1/2000 | Disher .......................... 224/666 |
| 6,634,531 | B2 | * | 10/2003 | Conte ........................... 224/407 |
| 6,701,947 | B1 | * | 3/2004 | Ramos ........................ 135/34.2 |
| 6,966,470 | B1 | * | 11/2005 | Charlton ...................... 224/407 |
| 7,661,223 | B2 | * | 2/2010 | Dudney ............................ 43/26 |
| 7,828,027 | B2 | * | 11/2010 | Mangano et al. ............. 150/103 |
| 7,988,681 | B2 | * | 8/2011 | McGarity et al. ............. 604/317 |
| 8,079,172 | B2 | * | 12/2011 | Dudney ............................ 43/4.5 |
| 8,522,475 | B2 | * | 9/2013 | Castleberry ................. 47/41.01 |
| 2003/0006262 | A1 | * | 1/2003 | Lewis ........................... 224/610 |
| 2003/0052464 | A1 | * | 3/2003 | McGuire ................. 280/33.992 |
| 2006/0289044 | A1 | * | 12/2006 | Benett ............................. 135/16 |
| 2007/0029745 | A1 | * | 2/2007 | Ursettie .................. 280/33.992 |
| 2007/0241145 | A1 | * | 10/2007 | Williams ................... 224/148.7 |
| 2008/0267540 | A1 | * | 10/2008 | Ashworth ....................... 383/81 |
| 2009/0265985 | A1 | * | 10/2009 | Weder ............................ 47/66.7 |
| 2012/0067471 | A1 | * | 3/2012 | Swift et al. .................... 150/100 |
| 2013/0061891 | A1 | * | 3/2013 | Guimaraens et al. ........ 135/34.2 |

FOREIGN PATENT DOCUMENTS

| | | | | |
|---|---|---|---|---|
| DE | 197 23 886 C1 | | 11/1998 | |
| DE | 200 15 603 U1 | | 1/2001 | |
| EP | 0 180 314 A2 | | 5/1986 | |
| EP | 0376153 A3 | * | 4/1991 | ............... B60R 7/12 |
| FR | 2846858 A1 | * | 5/2004 | ............... A45C 3/04 |
| GB | 191321157 A | * | 0/1914 | ............. A45B 25/24 |
| GB | 166225 A | * | 7/1921 | ............. B62B 9/147 |
| GB | 273967 A | * | 7/1927 | ............. B62B 9/147 |
| GB | 915046 A | * | 1/1963 | ............... B60R 7/12 |
| GB | 2082990 A | * | 3/1982 | ............... B60R 7/00 |
| GB | 2226948 A | * | 7/1990 | ............. A45C 11/00 |
| GB | 2452560 A | * | 3/2009 | ............. A45B 25/24 |
| JP | 2005312800 A | * | 11/2005 | ............. A47G 25/12 |
| WO | WO 2008/139177 A2 | | 11/2008 | |

OTHER PUBLICATIONS

Raw machine translation of JP 2005-312800.*

* cited by examiner a) 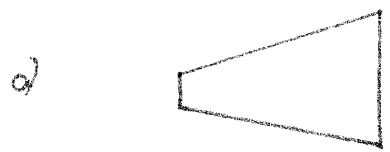
b) 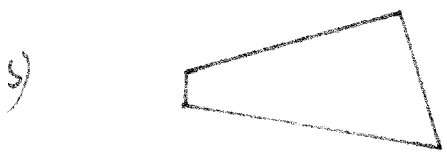
c) 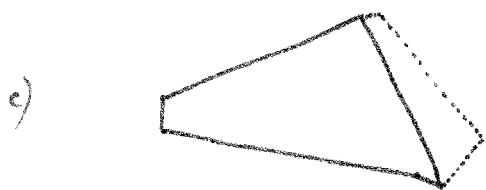
d) 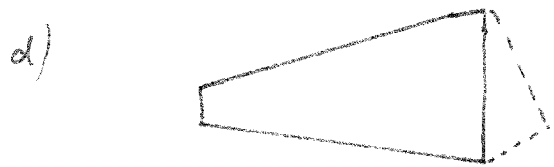   
                i)      ii)     iii)    iv)
e) 
f) 
Fig. 6

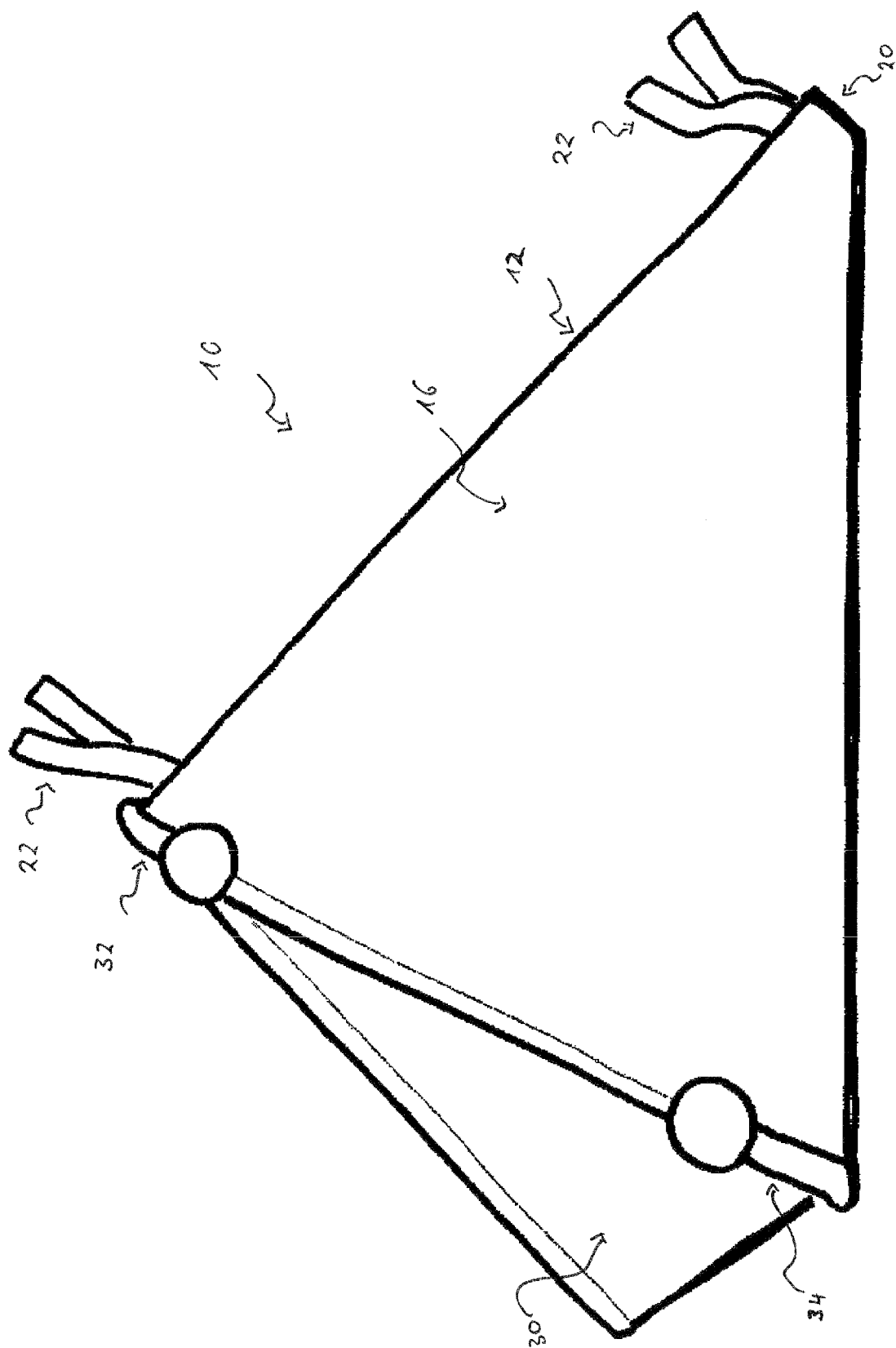

CONTAINER FOR RECEIVING AND CARRYING ELONGATE OBJECTS

This nonprovisional application claims priority under 35 U.S.C. §119(a) to German Patent Application Nos. DE 10 2012 203 838.8, which was filed in Germany on Mar. 12, 2012, and to DE 20 2012 003 974.1, which was filed in Germany on Apr. 18, 2012 and which are both herein incorporated by reference.

BACKGROUND OF THE INVENTION

1. Field of the Invention

The present invention relates to a container for receiving and carrying objects, in particular elongate objects. The invention particularly relates to a container which can be mounted to a stroller.

2. Description of the Background Art

Nowadays strollers are the standard means of transport for babies and infants. There are different kinds of stroller types. The classic stroller type is adapted for the transport of babies and infants in a lying position and comprises a transporting component, such as a basket or a detachable carrier bag, and a frame. Additionally or alternatively, strollers, in particular sport strollers or buggies generally comprise a footrest and are, additionally or alternatively, adapted for the transport of infants in a seated position. All strollers comprise wheels with most stroller types comprising three or four wheels. These wheels are connected to the transporting component of the stroller via different elements which for instance form a frame. These elements usually comprise different rods or side frames, with at least some of them generally forming an angle between 0° and approximately 80° with the horizontal (when used on even ground).

Elements which are adapted for carrying objects are often mounted to such strollers. Hence, strollers often comprise nets and/or storage areas which enable the transport of objects. Yet, such nets and/or storage areas are only suitable for the transport of certain objects and are therefore often of limited practical use. In particular large, bulky and/or elongate objects are difficult to transport with such appliances. Such systems are thus not particularly suitable for the transport of objects such as elongate baguettes, flowers, rolls (e.g., gift wrapping paper), sticks, umbrellas, sports equipment, such as hockey sticks, and/or large balls (e.g., soccer balls). In practice, such objects are therefore often placed over the push handle transverse to the direction of movement of the stroller. This, however, has impeding effects when the length of the objects to be transported exceeds the breadth of the stroller. At the same time, objects which are transported in said manner are often not properly fixed and break loose during use. Therefore, such objects are often stored away and carried or transported separately in additional known containers, such as backpacks.

SUMMARY OF THE INVENTION

It is therefore an object of the present invention to solve the problems associated with the prior art. The present invention especially aims at providing an improved transportation facility, in particular, for bulky, and especially, elongate objects on devices, such as strollers. Advantageously, the provided solution is easy to handle. A functional and visual compatibility should advantageously also be provided. With this, a safe, comfortable and space-saving transport should in particular be provided. Moreover, particularly in view of the rising demands on the visual design of strollers, visual appeal is to be improved. Preferably, the present invention should be applicable in various different ways.

In an embodiment, by a container and a system having a stroller and the container. The container can have substantially a shape of a cornet or a pointed paper bag, similar to those typically used for sweets. In other words, the container can be shaped like a frustum or a cone. In particular, the container may have an essentially round cross-section and preferably a round cross-section or may at least be adapted to adopt such a cross-section. In addition, the container can have a container cladding. The container cladding may also be referred to as a container mantle, a mantle surface or a lateral surface. The cladding may be continuous and may in particular be devoid of any sharp bends. The container cladding in turn preferably comprises woven material, more preferably fabric and/or woven synthetic material which even more preferably comprises water-repellent fibers, such as, for example, polyester and/or nylon. Hence, the container is preferably not dimensionally stable, but can be folded and/or inflated by a user. Moreover, the container may also comprise non-woven material, especially synthetic material, such as tarpaulin material. Therefore, the container may have the shape of a frustum, and, e.g., when folded, also the shape of a triangle and/or trapezoid which is preferably a substantially isosceles trapezoid.

The container can also have a cladding with an inner surface and an outer surface as well as at least one first container opening on one end of the cladding, preferably a longitudinal end of the container cladding, and, in addition, one or more mounting elements for mounting the container to a stroller. This, at least one, mounting element is advantageously arranged in the portion of the outer surface of the container. The mounting elements may be located on the container cladding. The first opening extends transversally to a longitudinal direction and/or a longitudinal axis of the container. It is further preferred that said first container opening is located on a longitudinal end of the comet, the cone or the frustum, which end comprises a larger circumference or diameter than the opposite longitudinal end. The container can be adapted such that the first container opening faces a user pushing a stroller when the container is mounted to a stroller. Two mounting elements can be provided, which are spaced apart from each other. The container is suitable for receiving and carrying especially long objects, and particularly preferable for the transport of elongate objects. The container is preferably also particularly suitable for the transport of fragile, bulky, unhandy, dirty and/or wet objects, such as: sports equipment, especially hockey sticks, billiard cues, (mini) gulf clubs, rackets (e.g., for tennis, squash, badminton), sticks for Nordic walking, so-called "swim noodles", umbrellas, balls, (French) bread, flowers, etc. Preferably, the container is adapted to carry several objects at once. This allows for the provision of a container in which long and bulky objects can be easily and practically carried on strollers. Compared to the conventional art, this container facilitates safe and easy carriage of objects, such as hockey sticks, umbrellas and/or other objects. These objects can now be easily carried along without running the risk of losing them or limiting the stroller's use, let alone, endangering passersby or the child to be transported. The container may be mounted to a stroller such that a child or a baby who is in the stroller does not get into contact with the objects to be transported and/or cannot reach them.

The container may substantially have the shape of a hollow cone and/or of a hollow frustum. In such a container, the maximum volume possible can be enclosed in interior of the container. In other words, this is the state of maximum "inflation" of the container. Such cone or frustum has a longitudinal direction and an axis extending in longitudinal direction, preferably an axis of symmetry. Each point on a preferably (rotationally) symmetric hollow cone or frustum can be clearly determined by the allocation of a circumferential angle in circumferential direction and a distance from the apex which, in case of a cone actually exists or, in case of a frustum can easily be construed. If on such a cone or frustum two points having the same circumferential angle are linked with each other, the connecting line will extend between them without altering in circumferential direction. Preferably, in an embodiment, any such connecting line defines a longitudinal axis of the container. Preferably, in an embodiment, all axes that extend along the longitudinal direction/extension of the container are considered longitudinal axes. Preferably, in an embodiment, the largest diameter of the container can be smaller, preferably substantially smaller, than the length of the container (i.e. from the first opening to the opposite end, preferably the second opening). Although it is easier to base the description on cones and frustums, the skilled person is also aware of the fact that these longitudinal axes are still existent when the container is folded such that portions of the inner surface of the cladding touch or nearly touch other portions of its inner surface.

The container, in top view perpendicular to such a longitudinal axis, can have an angular extension of no more than approximately 60°, more preferably from approximately 20° to 55°, even more preferably from approximately 20° to 50°, and most preferably from approximately 35° to 50°, and 35° to 47°. A range from 40° to 50° is also possible. This angular extension in top view can be present when the container is shaped like a frustum and/or cone as well as when the container is folded as described above. Due to such angular extension especially elongate objects can be easily and safely stowed away in the container.

The container can be mounted to other mobility devices, e.g., wheelchairs and/or wheeled walkers or rods thereof and/or to design the container such that it can be mounted thereon.

It is furthermore preferred, in an embodiment, to adapt the mounting elements such that they allow mounting and preferably fastening of the container to at least one rod of a stroller. More preferably, this fastening can be detachable. This not only allows a practical stowage of bulky and in particular elongate objects in the container, but also practical and easy mounting and/or fastening of the container to a stroller. The container is preferably mountable to a rod of a mobility device, in particular a stroller, which extends substantially in the direction of movement. Here, the rod is preferably a continuous rod, but may also be more than one directly or indirectly linked rod or frame element.

The container can be adapted such that it can be mounted to various types of strollers. This can be ensured by designing the mounting elements of the stroller such that they can be mounted to various types of strollers and/or to differently configured rods or rod elements. As a result, a container can be used with different types of strollers or, in more general terms, with different mobility devices and models thereof.

Alternatively, the container can be configured such that it can only be used with a selection of models and, in particular, with only one type of mobility device, preferably a stroller.

In an embodiment, a design of the mounting elements can be adapted to allow mounting of the container to a rod of a stroller, said rod defining in normal use an angle with the horizontal ranging between 20° and 70°, preferably between 30° and 60°, more preferably between 35° and 55°, and most preferably between 40° and 50°. Especially when compared to rods having an almost horizontal or almost vertical arrangement, mounting elements which are adapted for mounting a container to a rod of a stroller, with said rod being arranged in the domain of the angle bisector between the horizontal and the vertical line, should be configured such that they are capable of mounting the container, along the rod and capable of resisting a force (in particular a component of gravity) perpendicular to said rod. However, mounting elements which are merely adapted for mounting something to a vertical or horizontal rod do not have to be capable of resisting a force transversal to and/or along the rod.

The container can have at least two and more preferably exactly two or three mounting elements for mounting the container to a stroller. It is preferred that these elements are arranged on substantially the same circumferential angle of the container cladding. It is also preferred that two of the mounting elements are arranged in portions of opposite ends in a longitudinal direction of the container cladding. When three mounting elements are used it can be further preferred that the distance between two neighboring mounting elements is substantially the same. The provision of at least two and preferably exactly two or three mounting elements can contribute to a suitable fastening of the container to a stroller. At the same time the number of mounting elements remains limited, especially when two or three mounting elements are envisaged, which ensures easy handling of the container.

It is further preferred, in an embodiment, that the mounting elements are adapted to at least partially, and more preferably entirely, enclose the rod of the stroller in a circumferential direction, thereby achieving fastening of the container. As previously mentioned, one object of the present invention is to provide a simple, safe and practical transport option for elongate objects mounted to a stroller. An appropriate choice of the mounting elements allows simple, practical and safe mounting of the container to a stroller and/or to a rod thereof. One embodiment of the mounting elements is to configure the mounting elements such that each one comprises two portions which can be brought into engagement with each other. In this context, the term engagement means any connection capable of resisting a force. This can preferably be realized by the provision of a hook-and-loop fastener, a button fastener, preferably a press button fastener, but also by laces, clips, in particular c-clips made of plastics and/or adhesive material. The provision of self-closing clamps and/or ribbons, but also of hooks, e.g., spring hooks, is also possible. It is particularly preferred that one of the two portions comprises loops while the other one comprises hooks, with these being arranged such that they are engageable when the two portions at least partially enclose the rod. With such a hook-and-loop fastener mechanism the user can easily and practically engage and disengage the portions of the mounting elements. The fastener allows the user to mount the container to a stroller, if desired, and to remove the container from the rod of a stroller, when its fastening to the stroller is no longer desired. At the same time secure fastening of the container to a rod of the stroller is guaranteed.

According to a further embodiment, an additional supporting or reinforcing rod is provided and arranged such that the container, when mounted to a stroller, e.g. to a rod of the stroller, is given a directed stabilization, which by way of example is substantially parallel to this rod and extends, at least, over a major part of a longitudinal direction of the container cladding. It is particularly preferred that this supporting rod is placed on an inner surface or in the interior of the container. Moreover, it is particularly preferred that this supporting rod extends along a longitudinal direction of the container. Such a supporting rod can contribute to the dimensional stability and the stability of the container in general. Additionally, it can facilitate a simplified alignment, e.g., parallel to a rod of a stroller. Such a rod preferably comprises wood, metal and/or plastics material. Alternatively or additionally, it is possible to configure the container and in particular the mounting means such that the container is mountable to a stroller when the container is under tensile stress and/or capable of absorbing tensile stress. This can preferably be achieved in combination with mounting points (additional or inherent ones) provided on the stroller and/or by configuring the mounting elements respectively.

When such a supporting rod is provided, the mounting elements can be arranged in portions on the outer surface of the container where, on the corresponding inner surface, the supporting rod is arranged. Therefore, when in use the supporting rod can for instance be aligned in parallel to a rod of the stroller or, if such a rod is missing, provide for the necessary stability of the container. This ensures simplified mounting and handling of the container.

It is further preferred, in an embodiment, to additionally provide a loop in the first container opening, which allows fastening of long objects. This loop may, for example, be made of an elastic material which, e.g., is by way of example used for elastic bands of trousers, jackets and/or backpacks. As a result, elongate objects can be additionally fastened which further alleviates transport thereof and increases transport safety. The loop's circumference can be smaller than the circumference of the container opening, namely such that the ratio of the circumference of the first container opening to the circumference of the loop is between 1 to 6, preferably between 1.5 and 5, more preferably between 2 and 4 and most preferably between 2.5 and 3.5.

This further limits the space in which elongate objects can be aligned when they are fastened by the, preferably elastic, loop. It is further preferred that the loop comprises an adjustment element for adjusting length and circumference. Consequently, the loop's circumference can be adjusted and elongate objects can be fastened properly via such an adjustment element. The adjustment element can be adapted to fix two points and/or portions of the loop so that two sub-loops are formed, which are limited through the two points and/or the portions. As a result, the appropriate size of the two sub-loops can be selected in order to ideally fasten elongate objects, such as hockey sticks and umbrellas. Such an adjustment element further contributes to user convenience and enhances safety. This also allows accommodating and/or mounting of several objects.

It is additionally preferred, in an embodiment, that a second container opening is provided on one end of the cladding, which is opposite to the end of the first container opening. In case such a second container opening is not provided, the container may be cone-shaped. In case such an opening is provided, the container may be formed in the shape of a frustum. It is however not required that one or both container openings necessarily extend in circumferential direction only, that is transverse to a longitudinal axis, even though the openings essentially extend in the circumferential direction, i.e. transverse to the longitudinal axis. It may, however, also be preferred that the container openings are "beveled", i.e. that with respect to the above described coordinates, the distance between the opening and an actual or construable apex or cone point is different. Regarding its dimension and configuration, such a second container opening may for example be adapted such that liquid, dirt and/or sand can be channeled off and/or elongate objects can be put through. Especially with water-repellent and/or waterproof materials it may be advantageous to configure the container opening such that it is capable of channeling off liquids in order to prevent accumulation of liquids in the container during use. This could for example occur when the container is used in rain or when an umbrella with residual moisture or any other moist object with liquid on it is put into the container. It is further preferred that the container opening is configured such that long objects can be put therethrough. The second container opening, particularly its diameter, is preferably smaller, more preferably substantially smaller than the first container opening, particularly its diameter. The second container opening preferably has a circumference from 4 cm to 12 cm, more preferably from 5 cm to 10 cm and most preferably from 6 cm to 8 cm. The ratio of the circumference of the first container opening to the circumference of the second container opening preferably is between 2 and 30, more preferably between 6 and 20, even more preferably between 10 and 15, and most preferably between 12 and 14.

It is furthermore preferred, in an embodiment, to provide an additional collar portion on the container, which may be folded up and/or down and out. In the fold-up state the collar portion can be circumferentially surrounded by the container cladding. It may however also be preferred that the collar portion circumferentially surrounds a portion of the container cladding in the fold-up state. In the fold-out state the collar portion preferably tapers with increasing distance from the container cladding. In particular this means that the collar portion close to the cladding portion has a greater circumference than further away from it. Such collar portion can be mounted in the portion of the first container opening of the container.

In top view perpendicular to a longitudinal direction of the container, the container can have, in a folded state in which portions of the inner surface of the container touch or nearly touch other portions of the inner surface of the container, the shape of an acute triangle or substantially the shape of a, preferably isosceles, trapezoid. When the collar portion is folded out, the container preferably substantially comprises, when viewed perpendicular to a longitudinal direction of the container, the shape of a kite which is cut either on one side or on both sides. If one considers the basic shape of the container a cone and/or a frustum, the collar portion in the fold-out state will then preferably substantially be a portion of a cladding surface of a second frustum, which is arranged on the first container opening and tapers with increasing distance to said cladding surface. It is particularly preferred when the collar portion is beveled in the fold-out state. In the folded state this means that the cut through the kite is not parallel to the end line of the container cladding. It is particularly preferred to bevel the collar portion, such that in a portion which with respect to the circumference of the container cladding is opposite to the mounting elements comprises more material than on the circumferential side on which the mounting elements are located. Consequently, the container is configured such that, when equipped with a collar portion and the collar portion is in the fold-out state, the dropping out of objects from the first container opening is hampered and/or prevented.

The collar portion preferably comprises an opening which is not larger than the first opening of the container. It is further preferred that the circumference of the opening of the collar portion and/or the circumference of the first opening of the container is variable in size. This may for example be implemented by providing an elastic cord and/or a zipper. Hence, the user may adapt the opening to current needs and in particular to the objects to be transported. In particular, the user can also fully close the opening in order to protect the objects in the container from external influences, especially dirt, rain, snow, sun and/or humidity.

It is further preferred, in an embodiment, that the container can be adapted for being folded along a longitudinal axis or for being wrapped around a longitudinal axis one or more times. It is furthermore preferred that the container can be held by one or more retaining elements in the folded and/or wrapped state. The retaining elements may, inter alia, be configured as lace elements, button elements or zipper elements.

It is further preferred, in an embodiment, that the retaining elements can have two engaging elements which are mounted on opposite sides of the first container opening and configured to be engageable or brought into engagement. In this context the term opposite means opposite or opposed with respect to the circumferential direction. The terms "engageable" and "engagement" refer to any connection capable of resisting a force. Such connection could be provided by a hook-and-loop fastener, a button fastener, preferably a press button fastener, and/or laces. Buckles, ribbons and/or belts can also be envisaged.

In an embodiment, one of the engaging elements can have loops and the other one hooks. Due to the provision of such engaging elements a folding and/or a wrapping of the container can be held in position. This allows the user to closely engage the container with an object placed inside the container. In addition, the first container opening can thus be closed flush with a elongate object. It is also possible that the first container opening is closed when no object protrudes from it. As a result, the container interior and objects located therein can be protected from dirt and/or moisture from the outside. For example, it could be possible to tightly wrap an umbrella located in the container. Hence, the container would need substantially less space during use than if such wrapping was not possible or if engaging elements which hold such wrapping and/or folding in position were not provided. This feature therefore further contributes to easy handling and practicability of the container.

Moreover, the engaging elements can be configured such that the elements themselves comprise different portions. Hence, an engaging element can have an engagement portion adapted for being engaged and/or engageable with a further element, and a bridging portion. The engagement portion can be connected to the container cladding via the bridging portion. The length of the bridging portion can be variable and adjusted by the user. Furthermore, properties of a bridging portion, such as length and/or elasticity, may be adjustable. For instance, this can be realized by configuring a bridging portion such it can be twisted and/or wrapped while its properties depend on the intensity and/or number of wrappings and/or twists.

Alternatively or additionally, the bridging portion may comprise an element for length adjustment. This element can be adapted such that at least parts of the bridging portion can be put therethrough one or more times, preferably in various orientations and/or directions. Thus, a length of the bridging portion which connects the engagement portion with the container may be set and fixed. The fixing is preferably performed by tightening along one direction.

It is further preferred, in an embodiment, that at least one additional corresponding element can be allocated to at least one engaging element, preferably to all engaging elements. Each correspondence element is adapted to be engaged with the engaging element it is allocated to, when this engaging element is not engaged with the other engaging element and/or when the container is not folded and/or wrapped. In other words, the correspondence elements are for example adapted to be engaged with the engaging elements when the container is not intentionally folded and/or wrapped by the user. The correspondence elements can then ensure that the respective allocated engaging elements are fastened to a defined point in said state. Hence, when for example an engaging element comprises loops, the allocated correspondence element may comprise hooks (and vice versa) and the correspondence element of a press button head may comprise a press button recess. The correspondence elements can be arranged such that the engaging element they are allocated to may be easily engaged with them in a state which is not manipulated by the user, i.e. the correspondence elements are particularly preferably arranged close to the engaging element they are allocated to. This particularly ensures safe, trouble-free and, optionally, visually appealing positioning of the engaging element.

Additionally or alternatively, further accessory engaging elements can be arranged on other portions of the container. For example, it is preferred to provide accessory engaging elements on a boundary/margin of the first opening and/or on a boundary/margin of the collar portion. These accessory engaging elements may then be brought into engagement with each other or with one of the described other engaging elements. This allows for example the adjustment of the circumference of the first opening or the opening of the collar portion, whereby the above mentioned advantages may preferably be achieved.

Furthermore, it is preferred, in an embodiment, that the internal volume of the container is adaptable, preferably with respect to volume shape and/or volume content. A volume which is enclosed in the container cladding may in particular be adjusted by folding and/or wrapping. This allows the user to adapt the container to his/her current needs. If, for example, the user wants to use the container for transporting a hockey stick, it will be preferred to generally use a form different from the one for transporting a soccer ball. Thus, the adaptability of the container volume is a feature which particularly allows the application of the container for the transport of different and differently shaped objects.

It is particularly preferred, in an embodiment, to adapt the container such that it can carry different and heterogeneous objects at the same time. Consequently, round objects, e.g., a soccer ball, and elongate objects, e.g., umbrellas and/or hockey sticks, can be carried in the container at the same time in a practical manner. The same holds true for hard, robust objects such as, hockey sticks and soft, delicate objects, such as flowers.

The container preferably, in an embodiment, comprises a length ranging from 0.3 m to 1.0 m, more preferably from 0.35 m to 0.7 m, even more preferably from 0.4 m to 0.6 m, and most preferably from 0.45 m to 0.5 m. It is also preferred that the circumference of the first container opening ranges from 0.5 m to 1.3 m, more preferably from 0.6 m to 1.2 m, even more preferably from 0.7 m to 1.1 m, and most preferably from 0.8 m to 1.0 m. These dimensions are particularly suitable for firstly mounting a container according to the present invention to a stroller, and secondly are optimally adapted for receiving and carrying various objects.

It is preferred, in an embodiment, that the container comprises an additional fixing element adapted to be engaged with at least one of the engaging elements. The fixing element can be configured such that it can be arranged on a portion of the mounting element and be engaged therewith. It is further preferred that the fixing element comprises hooks and/or loops in order to be engageable with at least one of the engaging elements. The fixing element preferably comprises an end portion having a loop through which a portion of the mounting element can be passed. The length of the fixing element is preferably about one third of the length of the container in longitudinal direction, and preferably between 10% and 50% of the length of the container in longitudinal direction. The fixing element can further comprise a relatively flexible material, for example, woven material.

In an embodiment, a container can be wrapped around a longitudinal axis one or more times. It is furthermore possible that a container is squeezed, creased, wrinkled and/or "crumpled" in a direction substantially perpendicular to a longitudinal direction. An end portion of a fixing element may be engaged with the engagement portion of an engagement element, both when the container is wrapped around a longitudinal axis and when its expansion is reduced by creasing and the like. Alternatively, the fixing element may be realized in the form of a loop element. Such loop element preferably comprises a loop which, more preferably, is an elastic loop. The loop may also be made from a ribbon forming a loop through the provision of a knot. Preferably, the loop element further comprises a loop adjustment element which separates the loop element into two sub-loops and further a stopping element configured to prevent detachment of the adjustment element from the loop element. Such a loop element is preferably inserted between the portions of the mounting element. In use, this loop element can be bordered by these portions and additionally by a rod of a stroller. Moreover, the loop element is preferably adapted to enclose the exterior of a container in a folded and/or collapsed state (for example, folded, squeezed, creased, wrinkled or crumpled) and thus to fix the expansion of the container.

The provision of such fixing elements and/or loop elements can help retain and/or fasten a container which is wrapped around a longitudinal axis or which is otherwise collapsed, in the wrapped state without having to at least partially wrap the container around a rod of a stroller.

The invention is also directed to a system with a stroller and a container as previously described. The stroller can include mounting points, preferably along a rod, whose connecting line forms, during normal use, an angle with the horizontal from 20° to 70°, more preferably from 30° to 60°, even more preferably from 35° to 55°, and most preferably from 40° to 50°. The container is preferably mounted to this points and/or this rod such that the first opening is located on a side on which the stroller comprises a push handle. Hence, the user of the stroller, i.e. the person who pushes the stroller, can easily and practically insert objects into or remove them from the container. Such an arrangement therefore further improves handling and practicality of such a system. It is furthermore also preferred to mount the container to the rod such that, in a view perpendicular to a longitudinal axis, the container together with the horizontal (preferably in horizontal position of the stroller) and/or with the ground (preferably when the stroller is positioned on ground which is inclined relative to the horizontal) covers an angular extension which is a partial range of the angular range between −5° (preferably 0° and more preferably 5°) and the angle between the horizontal and/or the ground and the rod of the stroller. In other words, the container is arranged such that at least a major part of the container encloses an angle with the horizontal, which lies between the horizontal and the angle between the horizontal and/or the ground and the rod of the stroller.

In other words, the cladding portion of the container, which is closest to a bottom surface can also extend, substantially in parallel to the bottom surface. In this connection, a deviation of about 5° in each direction is included. Preferably, the container and/or its lower edge and/or the mentioned cladding portion can enclose a positive acute angle Θ with the horizontal and/or the ground, which opens towards the first opening. This again helps prevent objects from dropping out of the container. Such fastening to a stroller or any other mobility device is advantageously facilitated by the previously described configuration of the container. The lateral arrangement on the stroller, i.e. along the direction of movement, is particularly advantageous with respect to visual and functional aspects. Further, the simple geometric shape of the container is both functional, as described above, and visually appealing. The container may have various visual designs regarding colors and patterns and may, in particular, be adapted to the coloring of the mobility device. The container is particularly suitable for adaptation to the objects to be received, ambient conditions and/or the mobility device. Preferably, the container is arranged on the stroller such that a child and/or a baby carried in the stroller does not and/or cannot get into contact with the objects to be transported and/or cannot reach them.

In an embodiment, the invention can include the following aspects: a container, preferably substantially comprising the shape of a cornet, preferably with a container cladding having an inner surface and an outer surface, a first container opening on one end of the container cladding and preferably with one or more mounting elements for mounting the container, in particular to a stroller, said mounting elements being arranged at the portion of the outer surface of the container, preferably for receiving and carrying elongate objects. In a top view perpendicular to a longitudinal axis of the container the container can inlcude an angular extension of no more than 60°, preferably between 10° and 55°, more preferably between 20° and 50°, and most preferably between 35° and 50°.

The mounting elements can be adapted for mounting the container to at least one rod of a stroller, and preferably releasable fastening.

The container and particularly the mounting elements can be adapted for mounting the container to a rod of a stroller, with said rod forming in normal use an angle with the horizontal from 20° to 70°, preferably from 30° to 60°, more preferably from 35° to 55°, and most preferably from 40° to 50°, wherein the container preferably is adapted to be mounted to the rod such that, in a top view perpendicular to a longitudinal axis, the container together with the horizontal covers an angular range which is a partial of the angular range from −5° and the angle between the horizontal and the stroller rod, with the algebraic sign of angle being defined such that the angle between the horizontal and the rod of the stroller is positive and further preferably the container is adapted to be mounted to this rod such that the first opening is mounted on a side on which the stroller comprises a push handle.

The container can have at least 2, preferably exactly 2 or 3 mounting elements for mounting the container to a stroller.

The mounting elements can be adapted for at least partially, and preferably, entirely enclosing the rod of the stroller in a circumferential direction of the rod, thereby fastening the container.

Each mounting element can have two portions which can be brought into engagement with each other.

Each one of the two portions can have loops and the other one of the two portions comprises hooks, these being arranged such that they can be engaged with each other when the two portions enclose the rod, at least partially, and preferably entirely.

An additional supporting rod can be provided that can be arranged, on the inner surface of the container such that, when the container is mounted to a rod of the stroller, the supporting rod extends substantially in parallel to said rod and at least over a major part of a longitudinal direction of the container cladding. The supporting rod can be made of wood, metal and/or plastics material.

The mounting elements can extend outwardly in portions of the outer surface, where on the corresponding inner surface, the supporting rod is arranged.

A loop can be provided in the first container opening, which allows fixing of elongate objects.

A ratio of a circumference of the container opening and a circumference of the loop can be from 1 to 6, preferably from 1.5 to 5, more preferably from 2 to 4, and most preferably from 2.5 to 3.5. The loop can be elastic.

The loop can have an adjusting element for the adjustment of length and/or circumference.

The adjusting element can be adapted for fixing two points and/or portions of loop such that two sub-loops are formed, which are limited by said points and/or portions.

The loop can be arranged in a portion of the first opening facing the mounting element.

A second container opening can be provided on one end of the container cladding opposite to the end of the first container opening. The second container opening can be adapted for channeling off liquids and/or for putting elongate object therethrough.

A collar portion can be provided that can be folded up and out, and which in the fold-up state is circumferentially surrounded by the container cladding, and in a fold-out state tapers with increasing distance from the container cladding, and, in particular, close to the cladding portion has a larger circumference than further away from it. The collar portion can be beveled in the fold-out state.

The container can be adapted to be folded and/or wrapped along a longitudinal axis, and kept in the folded and/or wrapped state by means of one or more retaining elements. The retaining elements can include two engaging elements which are mounted to opposite ends of the first container opening and which are adapted to be engaged with each other when the container is folded and/or wrapped along a longitudinal direction. Each of the engaging elements can include an engaging portion and a bridging portion, wherein the bridging portion connects the engaging portion to the container, and comprises an element for length adjustment. One of the engaging elements can have loops and the other engaging element can have hooks.

A fixing element can be adapted to, when the container is wrapped around a longitudinal axis or collapsed perpendicular to its longitudinal axis, engage with at least one of the retaining elements, preferably with one of the engaging elements, such that the container can be fixed in the wrapped and/or collapsed state, without the wrapping or collapse requiring to include elements which are not associated with the container.

The retaining elements can have an elongate configuration, and in a non-retaining state can extend along two longitudinal axes of the container, and in the retaining state extend preferably along one longitudinal axis of the container. The retaining elements can be, for example, a zipper.

Furthermore, an internal volume of the container is adaptable.

The container cladding can include woven material, preferably fabric and/or woven synthetic material which particularly preferably comprises water-repellent or waterproof fibers, such as polyester and/or nylon.

The container cladding can have a length of from 0.25 m to 1 m, preferably from 0.3 m to 0.7 m, more preferably from 0.3 m to 0.6 m and most preferably from 0.35 to 0.55 m.

The first container opening can have a circumference from 0.5 m to 1.3 m, preferably from 0.6 m to 1.2 m, more preferably from 0.7 m to 1.1 m and most preferably from 0.8 m to 1.0 m.

The second container opening can have a circumference, for example, from 4 cm to 12 cm, more preferably from 5 cm to 10 cm, most preferably from 6 cm to 8 cm, and/or wherein the ratio of the circumference of the first container opening to the ratio of the circumference of the second container opening is from 2 to 30, more preferably from 6 to 20, even more preferably from 10 to 15 and most preferably from 12 to 14.

The container can be adapted to receive and carry long objects, such as hockey sticks.

The container can be adapted to receive and carry round and bulky objects, such as soccer balls.

A system can include a stroller and a container according to any one of the preceding aspects.

The stroller can include a rod which in normal use forms an angle with the horizontal of from, for example, 20° to 70°, preferably from 30° to 60°, more preferably from 35° to 55° and most preferably from 40° to 50°, and wherein the container is mounted to this rod such that the first opening is mounted on a side on which the stroller comprises a push handle.

The container can be mounted to the rod such that, in top view perpendicular to a longitudinal axis, the container together with the horizontal covers an angular range which is a partial of the angular range from −5° and the angle between the horizontal and the stroller rod, with the algebraic sign of angle being defined such that the angle between the horizontal and the rod of the stroller is positive.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 6 illustrates various preferred basic forms of containers according to an embodiment of the invention in top view perpendicular to a elongateitudinal axis;

FIG. 7b is a schematic top view of a further configuration of an embodiment of a container according to the invention perpendicular to a longitudinal axis of the container.

DETAILED DESCRIPTION

Figure 1:
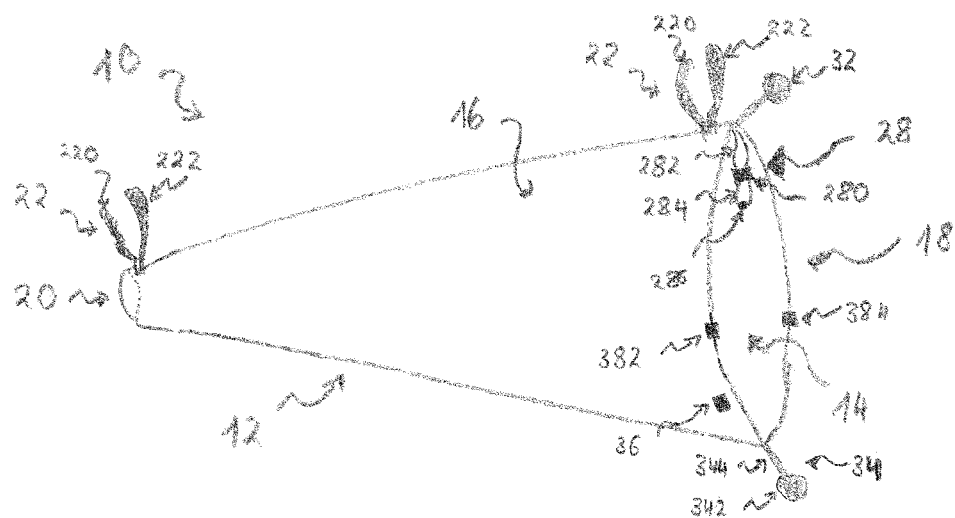
FIG. 1 is a perspective schematic view of an embodiment of a container according to the invention.

FIG. 1 shows a perspective view of an embodiment of the invention. FIG. 1 depicts a container 10 substantially having the shape of a cornet. Container 10 further comprises a container cladding 12 having a container outer surface 16 and a container inner surface 14. At a first end of the container cladding 12 a first opening 18 is located. Bulky and/or elongate objects can be passed through container opening 18. Such objects are, for example, flowers, (French) breads, umbrellas, hockey sticks, and the like. Typically, container cladding 12 has a length of between 0.3 m and 1 m, and particularly preferably a length of approximately 0.5 m. The embodiment shown in FIG. 1 further shows a second container opening 20 located at an end of the container cladding 12 opposite to the end of the first container opening 18. Thus, elongate objects, such as the ones mentioned above, can be passed through the entire container and project therefrom, or rather from the second container opening 20. Moreover, this embodiment comprises two mounting elements 22. By means of these mounting elements 22, the container can be attached to a stroller. Mounting elements 22 are arranged in the portion of the outer surface 16 of the container. They extend outwardly from the container. In a particularly preferred embodiment, mounting elements 22 have two portions 220, 222. These portions can be brought into engagement with each other. In this connection, engagement can mean any connection capable of resisting a force. Most preferably, the first portion 220 comprises hooks and the second portion 222 loops that are arranged such that they can be brought into engagement with each other when the two portions enclose a stroller rod at least partially.

Furthermore, in this embodiment a loop element 28 is attached in the area of the first container opening 18. In this embodiment, loop element 28 comprises a loop made of an elastic material that can be separated by an adjustment element 280 into two sub-loops 282 and 284. Adjustment element 280 may preferably be an adjustment element made from synthetics that can be adjustably attached to the loop. Such an adjustment element 280 is similar to an adjustment element as known for example from elastic bands or elastic cords used in jackets.

Moreover, loop element 28 comprises a stopping element 286 which prevents inadvertent detachment of the loop adjustment element 280 from the loop element 28. With loop element 28 it is possible to additionally fix elongate objects. Furthermore, FIG. 1 shows two engaging elements 32, 34 mounted at circumferentially opposite ends of the container 10 and/or the container cladding 12. The engaging elements 32, 34 are adapted for engagement with each other. They can be brought into engagement with each other by folding container 10 around a longitudinal axis or by wrapping it several times around a longitudinal axis. The engaging elements 32, 34 preferably comprise corresponding hooks and loops. In this way it is possible to reduce, in particular, the first container opening 18 thereby adapting it to the objects to be transported. Engaging element 34 further comprises an engaging portion 342 and a bridging portion 344. Typically, engaging portion 342 comprises those elements configured to engage with each other. Advantageously, engaging portion 342 comprises, for example, hooks. Bridging portion 344, however, is configured for connecting engaging portion 342 with container cladding 12. Typically, bridging portion 344 is formed from, or comprises, a material similar or identical to the container material 12. Furthermore, FIG. 1 shows a corresponding element 36 corresponding to engaging element 34. When engaging element 34 comprises hooks, corresponding element 36 may comprise loops. It is adapted to be engaged with engaging element 34 when container 10 and/or container cladding 12 is not wrapped and/or not substantially folded. In other words, in the "resting state" or in the unmanipulated state, these two elements can be brought into engagement with each other. Although not explicitly shown for engaging element 32, the skilled person will understand that a similar corresponding element may also be provided for this engaging element.

FIG. 1 also shows accessory engaging elements 382 and 384. These can also be brought into engagement with engaging element 34. In continuation of the above example in which engaging element 34 has hooks, accessory engaging elements 382 and 384 may have loops. The "lower" portion of container 10, i.e. a portion that in the circumferential direction is opposite to the portion in which loop element 28 is arranged, can then be folded so that engaging element 34 is brought into engagement with accessory engaging elements 382 and 384. By this, the size of opening 18 can be adapted.

Container 10 substantially has the shape of a cornet. Container 10 and/or container cladding 12 preferably comprises woven material, preferably fabric and/or a woven synthetic material which, particularly preferably comprises water-repellent and/or waterproof fibers, such as polyester and/or nylon. In other words, in a preferred embodiment, container 10 is not dimensionally stable. Thus, container 10 may both be folded and "inflated" or expanded. In the "inflated" or expanded state, container 10 has a substantially conical or frustum shape.

Figure 2:
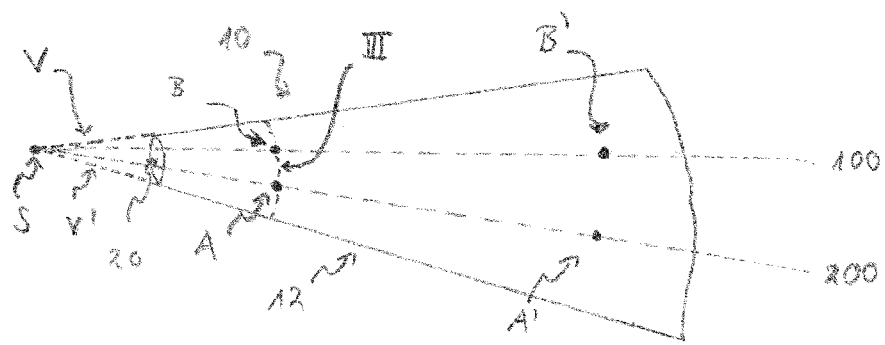
FIG. 2 is a schematic perspective view of a cornet in accordance with an embodiment of the invention for clarifying exemplary coordinates used in the description.
Figure 3:
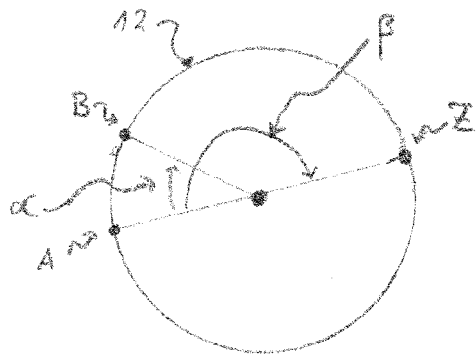
FIG. 3 is a section view along a plane defined by points A, B and line III in FIG. 2.

This shape is shown, for example, in FIGS. 2 and 3. Substantially conical and/or substantially frustum shape can mean that the container cladding 12 substantially corresponds to portions of a cone surface. FIG. 2 shows a schematic view of a container 10 which is substantially in the shape of a cornet. The shown embodiment additionally comprises a second container opening 20. Therefore, container 10 and/or container cladding 12 do not converge in one point of a cone. However, if one extends the outer boundary lines of the embodiment shown in FIG. 2 with the connecting lines V, V', these converge in an apex S. Container 10 and/or container cladding 12 (in the "inflated" state) substantially is located on a conus, or a cone having an apex S. Reference is now made to points A, B, A' and B' in FIG. 2. Each point on the above-described surface of a cone can be described by means of a distance from the apex S to an angle α in circumferential direction (see also FIG. 3). Points A and B are shown to have the same distance to apex S. FIG. 3 shows a section along a plane that is formed by points A, B and their connecting line III on the surface of the cone. In this transversal section, the container cladding 12 in the expanded state is substantially circular. Thus, points A and B which have the same distance to apex S are located on the same section ring of the container cladding 12. A circumferential angle α spans these points. Point Z as shown in FIG. 3 has a circumferential angle β of substantially 180° relative to point A. These two points are substantially opposite to each other in circumferential direction. The same applies to the two engaging elements 32 and 34 shown in FIG. 1.

FIG. 2 further shows points A' and B'. These points have the same circumferential angles as points A and B. In other words, points A and A' (and B and B', respectively) merely differ in their distance from apex S, but not in the direction of the circumferential angle. The connecting lines extending between points A and A', and B and B', respectively, are parallel to axes 200, 100. Each such axis 100, 200 extending on the container cladding and having a circumferential angle which does not change with the distance from apex S defines a longitudinal axis of the container 10 and/or the container cladding 12. With respect to these longitudinal axes it is further noted that container 10 and/or container cladding 12 does not need to extend evenly along all longitudinal axes on a cone. For example, it is preferable that container cladding 12 in a portion which in circumferential direction is opposite to the portion designated for the mounting elements 22 has a larger longitudinal extension than in other portions, and in particular, the portion designated for the mounting elements 22.

Figure 4:
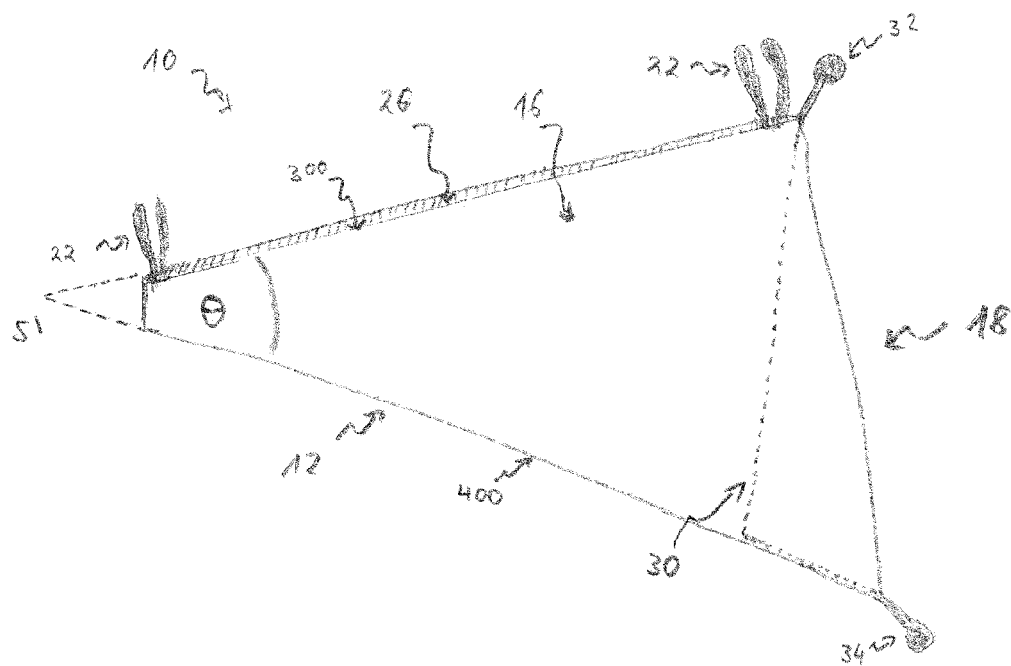
FIG. 4 is a schematic top view (and partial through view) on a container according to the invention perpendicular to a longitudinal axis of the container according to a further embodiment.
Figure 5:
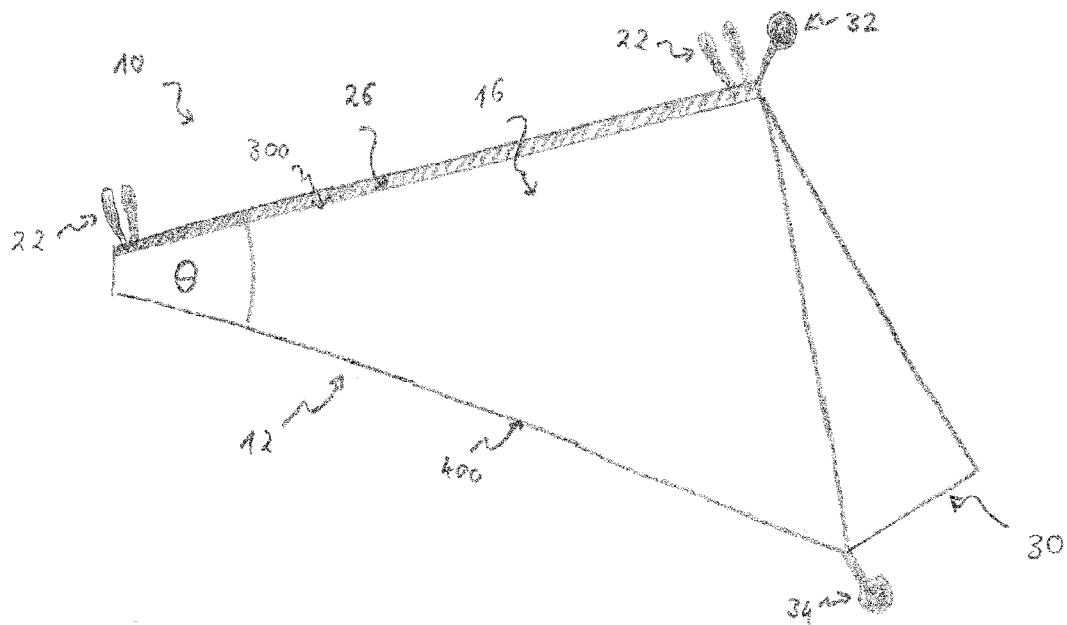
FIG. 5 is a schematic top view (and partial through view) as in FIG. 4, with the container of FIG. 4 being in a different state.

This is also shown in FIGS. 4 and 5. FIGS. 4 and 5 show views that are substantially perpendicular to a longitudinal direction. Since container 10 and/or container cladding 12 are preferably made from a material that is not dimensionally stable, such view can also be created by folding container 10 and container cladding 12 on top of each other in such a way that portions of the inner surface 14 come into contact. As can be seen from FIGS. 4 and 5, container 10 comprises different linear expansions along longitudinal axes 300 and 400. Moreover, it can be seen from FIGS. 4 and 5 that container 10 and/or container cladding 12, in particular in the folded state, or in a top view that is perpendicular to a longitudinal axis, substantially has the shape of a triangle, or of a truncated triangle or of a trapezoid. The angular extension Θ of this trapezoid is preferably acute and in the exemplary embodiment shown is approximately 25°, measured from a construed triangle apex S'. In addition to the elements already described in connection with FIG. 1, the exemplary embodiments shown in FIGS. 4 and 5 further comprise a reinforcing rod 26. Reinforcing rod 26 substantially comprises the same circumferential angle (as described in FIG. 3) as mounting elements 22. Consequently, in circumferential direction, reinforcing rod 26 is arranged on the same side as mounting elements 22. Furthermore, FIGS. 4 and 5 show a collar portion 30. The collar portion 30 is connected to the container cladding 12 in the portion of the first opening 18. Collar portion 30 can be folded up or in (as shown in FIG. 4) and folded out (as shown in FIG. 5). In the fold-up state, collar 30 is stowed in the "interior" of container 10. In other word, in the fold-up state, collar portion 30 abuts to the container inner surface 14. However, according to embodiments not shown here, it is also possible to fold collar portion 30 outwardly, so that in the fold-up state it surrounds the container cladding 12 on the outside. In the fold-out state (FIG. 5), collar portion 30 "lengthens" container 10. Advantageously, collar portion 30 is adapted such that it tapers with increasing distance from the container opening 18. This may mean, in particular, that close to the cladding portion 12 or close to container opening 18, collar portion 30 has a larger circumference than further away therefrom. Furthermore, as shown in FIG. 5, collar portion 30 in the fold-out state is preferably beveled. In particular, collar portion 30 in a circumferential portion opposite to the mounting elements 22 is preferably further extended than in the circumferential portion allocated to the mounting elements 22.

In use, mounting elements 22 may be used for securing the container 10 to a stroller, for example, to the side-frame or rod of a stroller. In that case, reinforcing rod 26 extends substantially in parallel to that rod of the stroller to which the container 10 is attached. Reinforcing rod 26 can further add to the stability of the container device 10. On the one hand, this applies to container 10 in general, but on the other hand, this also applies, in particular, to the fastening of container 10 to a stroller. Typically, the rod of the stroller on which the container 10 is mounted extends such that relative to the horizontal it encloses an angle of from 20° to 70°, and more preferably from 40° to 50°. In use, container 10 is arranged in such a way that the circumferential portion comprising mounting elements 22, reinforcing rod 26, and loop element 28 is arranged "at the top". As long as no further measures are taken, in particular, as long as engaging element 34 is not brought into engagement with engaging element 32, the circumferential portion comprising engaging element 34 and the longer circumferential side of collar portion 30 is arranged "at the bottom". It is particularly preferred that, in normal use, container 10 and each of its longitudinal axes encloses an angle larger than −5° with the horizontal. Here, a positive angle is to be defined by that the angle which the rod of a stroller, to which the container is secured by mounting elements 22, encloses with the horizontal must likewise be positive. In other words, or alternatively, the container is adapted such that in use, and in particular, when fastened to a stroller, the underside or lower edge 400 of the container extends substantially horizontally (in particular when used in the plane perpendicular to gravity), and, if inclined, preferably is inclined such that the angle is positive to the horizontal and that the first container opening 18 faces upwards (against the force of gravity).

In such an arrangement it is possible to insert elongate objects, such as hockey sticks, French bread, umbrellas and/or elongate flowers, into the container through the first container opening 18. Especially in case of elongate objects requiring further stabilization, it may be particularly preferable to fix one end of these objects with loop element 28. Thus, it is possible, for example, to position a hockey stick or an umbrella in container 10 in such a way that one end protrudes from the second container opening 20 and the other end from container opening 18, with the elongate object being additionally secured by loop element 28. In a next step, the container may be adjusted such that its circumference is adapted to the dimensions of the elongate object. This can be done, for example, by folding container 10 and/or container cladding 12 such that engaging elements 32 and 34 are brought into engagement with each other. Apart from the folding option, this may also be done by wrapping the container 10 and/or the container cladding 12 one or more times around a longitudinal axis, preferably around the longitudinal axis extending between the mounting elements 22, and, after wrapping, bringing engaging elements 32 and 34 into engagement with each other. If fastened to a rod of a stroller, the stroller rod can additionally also be enveloped or wrapped up. Furthermore, it is also possible to achieve the reduction in circumferential direction by providing a fold in longitudinal direction and a corresponding element, such as a zipper, that can also be closed in a longitudinal direction. Besides the elements described, a collar portion 30 can be provided for preventing spilling or dropping out of the objects.

Figure sequence 6 shows preferred geometrical embodiments or variants of the present invention. These Figures are top views that are perpendicular to a longitudinal axis.

Here, it must especially be taken into account that the basic shape of the container according to the present invention is not necessarily mirror-symmetric or even rotationally symmetric. However, according to preferred embodiments the container is mirror-symmetric and/or rotationally symmetric. On the one hand, this may have particular visual appeal. On the other hand, a symmetrical design may also facilitate fabrication steps and thus contribute to a simple and economical production process.

FIG. 6 a) is a top view of an embodiment in the form of a substantially isosceles trapezoid, while in FIG. 6 b) a section of the container and/or the container cladding corresponding to the above described first container opening 18 is beveled. FIGS. 6 c) and d) are top views of a container additionally comprising a collar portion. In these Figures, this collar portion is marked by a broken line. Preferably it can be folded up and turned up and down. As can be seen from FIGS. 6 c), 6d) i), iii), and iv), the collar portion of a first preferred embodiment is beveled. This may mean that the opening along the collar portion has a smaller circumference than the first container opening. In FIG. 6 iv) further exemplary tightening elements are shown, by which the circumference of a collar portion and/or the opening thereof can be altered. Such a tightening element may also be provided on the first container opening or on other collar portion forms. Moreover, according to FIG. 6 d) ii) it is also possible that the collar portion extends in parallel to the container opening and preferably adopts a substantially rectangular basic shape. In such a case, the collar portion has substantially the same opening size as the first container opening. According to further embodiments shown in FIGS. 6 e) and 6 f), the container, in a top view, may also have substantially the shape of an acute triangle. It is likewise possible that the second container opening is beveled (see FIG. 6 f), with the beveling direction not being limited to the exemplary embodiment shown here. In the view shown, the second container opening cannot affect the basic form of the container, for example, by being provided on the underside (according to the position in use and representation in FIG. 6), for example, substantially in a slotted shape.

Figure 7A:
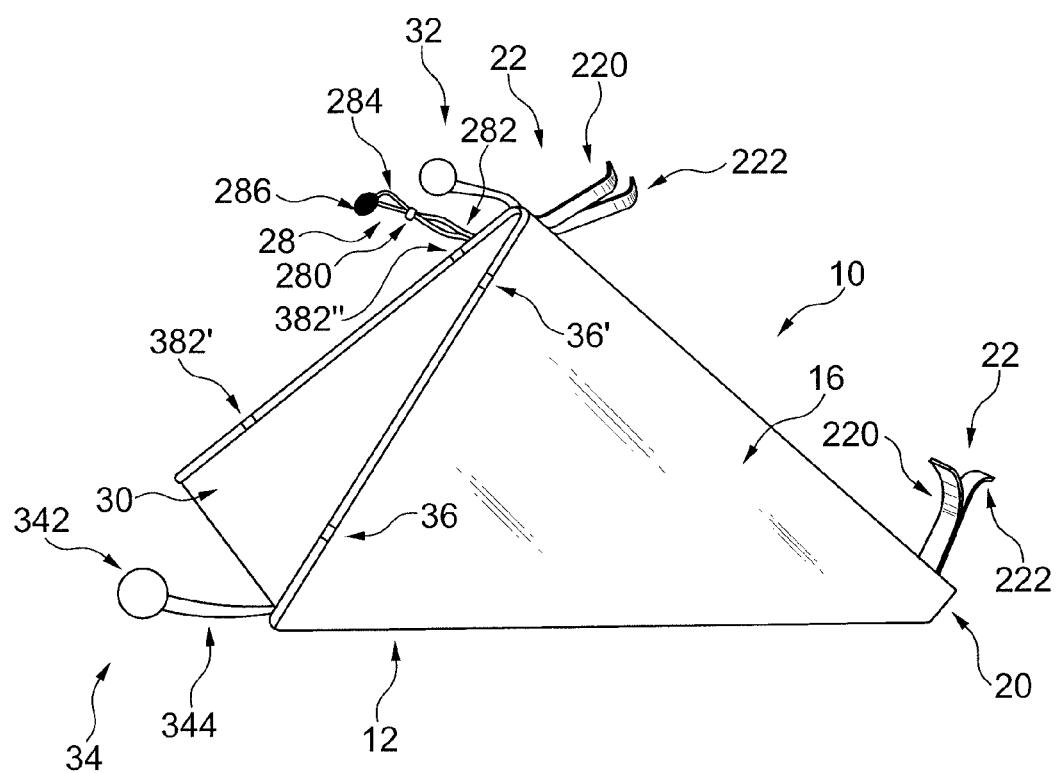
FIG. 7*a* is a schematic top view of a configuration of an embodiment of a container according to the invention perpendicular to a longitudinal axis of the container.

FIG. 7a shows a further embodiment of a container according to the present invention. Identical or similar elements to the ones in the above described embodiments have identical reference signs. In addition to the elements described above for the other embodiments, the present embodiment comprises accessory engaging elements 382' and 382" which are adapted for engagement with engaging elements 34 and 32, respectively. In contrast to the embodiment shown in FIG. 1, these accessory engaging elements 382', 382" are positioned at a boundary of a collar portion 30, whereby the opening of the collar portion 30 becomes adjustable. Furthermore, FIG. 7a shows corresponding elements 36 and 36' for engaging engaging elements 34 and/or 32 if the size of the opening need not be adjusted. The engagement of engaging elements 34 and 32 with corresponding elements 36 and 36' is adapted for fixing the engaging elements 34 and 32 in this state at a defined point and for preventing them, e.g., from swinging or dangling uncontrollably. This fixing is shown in FIG. 7b by way of example.

Figure 8:
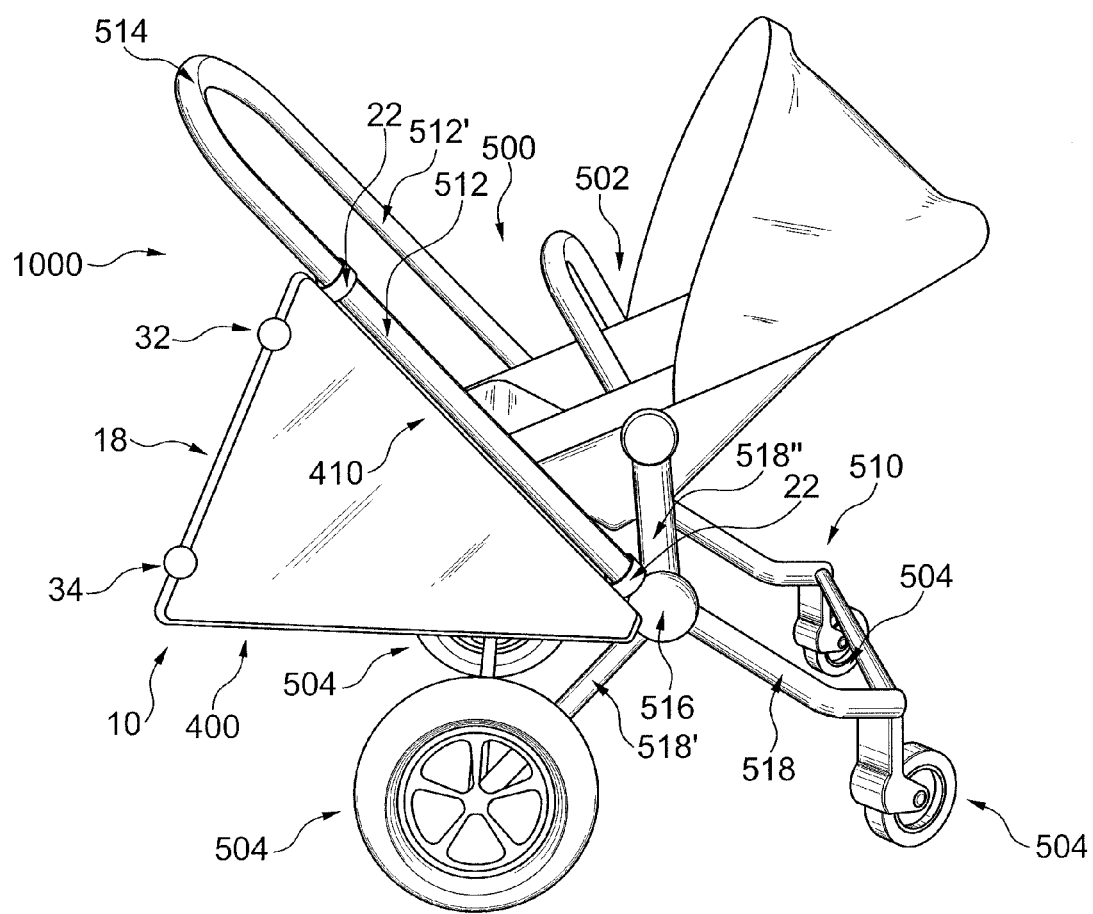
FIG. 8-13 are perspective schematic views of systems comprising a stroller and a container according to various embodiments or modifications of the present invention.

FIG. 8 shows a combination or system 1000 comprising a container 10 according to the present invention and a stroller 500. Although not explicitly mentioned and not explicitly emphasized by reference signs, the skilled person will know that container 10 may comprise various features and/or elements as described above. Stroller 500 is configured for carrying babies and/or infants. Stroller 500 comprises a basket or a transporting device 502 in which babies and/or infants may sit or lie. Transporting device 502 can also be adapted as detachable carrier bag. Moreover, the stroller 500 is provided with wheels 504. The exemplary embodiment shown has 4 wheels. However, it is also possible that a stroller 500 has more or less wheels. Preferably, stroller 500 has 3 or 4 wheels. These are connected to the transporting device 502 via a connecting element 510, such as a frame. The connecting element or frame 510 comprises various rod elements, in particular rods 512 and 512' which end in push handle portion 514. Rods 512 and/or 512' form here an angle of approximately 45° with the horizontal. However, a different angle can also be provided in other embodiments. Moreover, a rod 512 ends in hinge 516 that connects rod 512 with further rods 518, 518', 518". In the present embodiment, container 10 is connected to rod 512 of stroller 500 by mounting elements 22. This can be achieved, for example, by that mounting elements 22 comprise hook and loop elements adapted for engagement with each other. As stated above, there are also other fastening options. There are various ways of achieving tightening and/or stretching in a longitudinal direction of container 10. For example, container 10 may comprise a reinforcing rod 26. Furthermore, it is also possible that by suitable positioning of the mounting elements 22, container 10 is provided with the desired stretchability or tightenability. For this purpose, mounting elements 22 may be placed in a suitable distance from each other on rod 512. The skilled person will know that mounting elements 22 need not necessarily be placed on the same rod of the stroller. One of the mounting elements 12 may also be attached to rod 512, and the other one of the shown mounting elements 22 may be attached to a further rod, for example rod 518. As shown, container 10 is attached such that a first container opening 18 is located on that side on which the push handle 514 is disposed on the stroller 500, i.e. against the direction of movement. Moreover, container 10 is arranged such that it covers an angular extension which is substantially the same as the angular range between the horizontal and the angle enclosed between rod 512 and the horizontal. In other words, an upper angle boundary 410 of container 10 is substantially in parallel to rod 512, and a lower angle boundary 400 of container 10 is substantially in parallel to the horizontal. Furthermore, according to FIG. 8, engaging elements 32 and 34 are in engagement with their respective corresponding elements so that engaging elements 32, 34 are arranged in defined "resting positions".

Figure 9A:
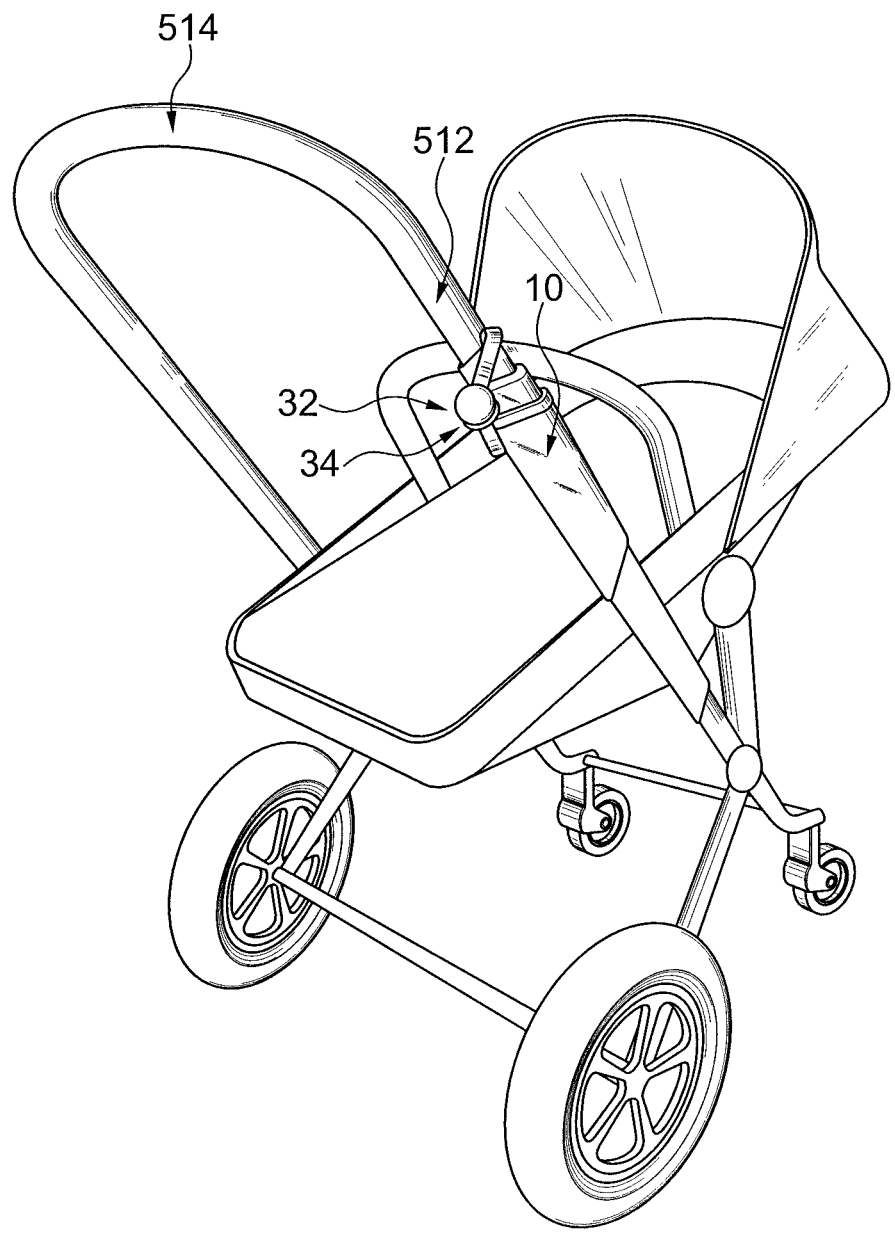
Figure 9B:
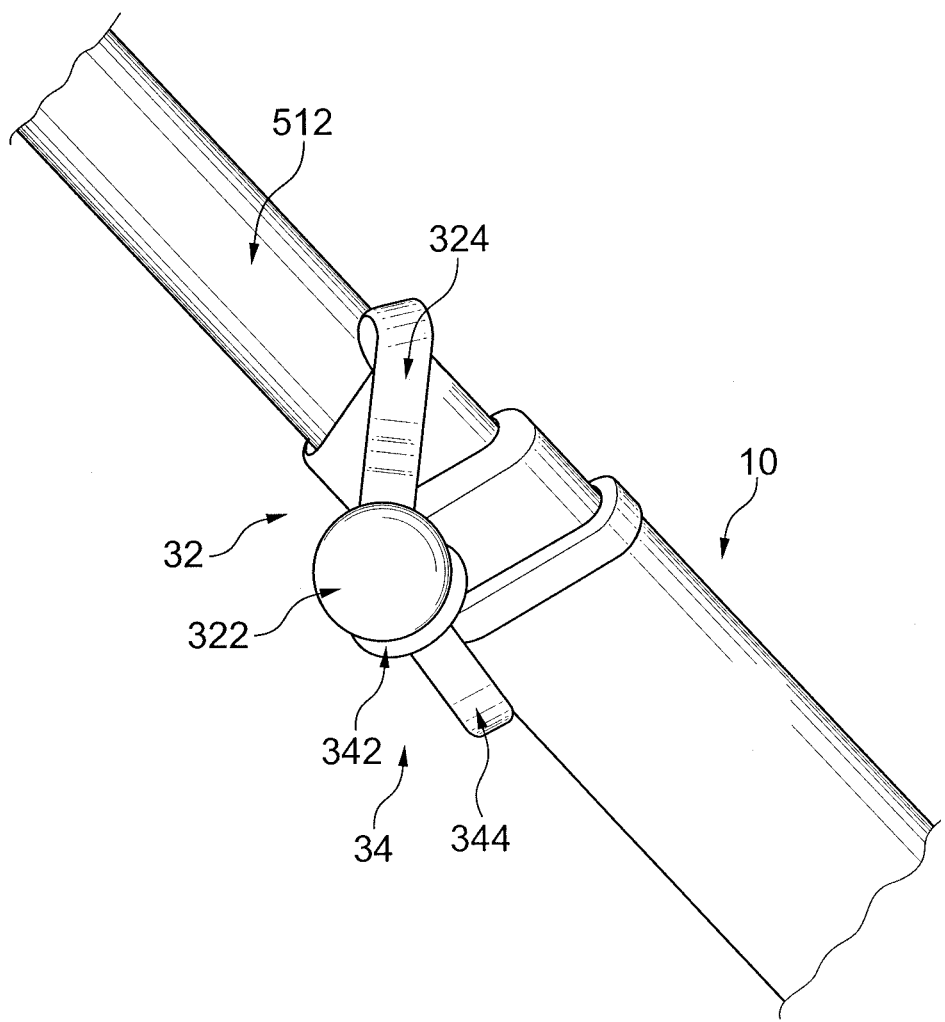
Figure 22:
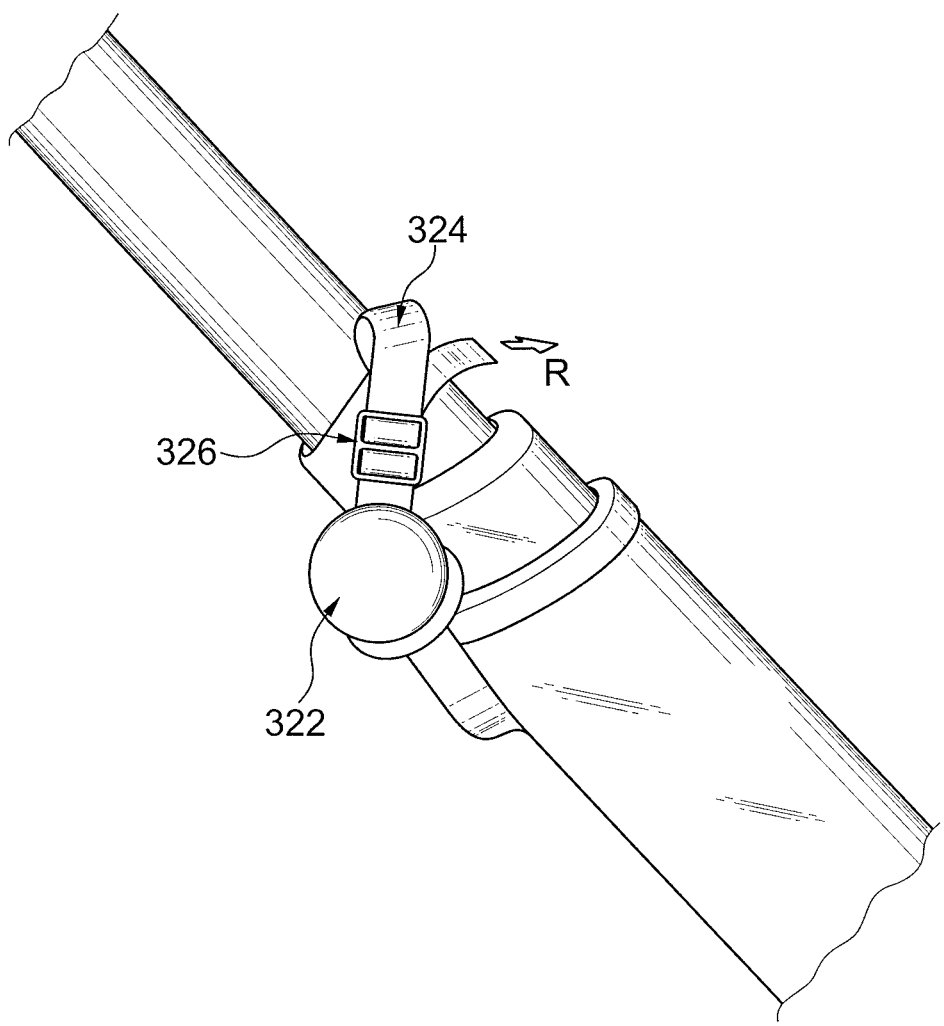
FIG. 22 is a schematic partial top view of a section of a container according to a further embodiment of the present invention.

FIG. 9a, on the other hand, shows a configuration in which container 10 is wrapped around a longitudinal axis. In the configuration shown, the stroller rod 512 is also wrapped in. Engaging elements 32 and 34 are in engagement with each other and hold the wrapped configuration in position. Alternatively and additionally, this configuration may also be provided with further elements, such as straps. From FIG. 9b, which is an enlarged partial view of FIG. 9a, it is also evident that engagement of the two engaging elements 32, 34 is brought about by engagement of their engagement portions 322 and 342. The engaging elements 32, 34 additionally comprise bridging portions 324, 344 which connect the engaging portions 322 and/or 342 with container 10. These may be adjustable in length and comprise, in particular, means for length adjustment. According to FIG. 22, an element for length adjustment 326 can be adapted such that at least parts of the bridging portion 324 can be passed through one or more times, preferably in different orientations or directions. In this way, a length of the bridging portion 324 connecting the engagement portion 322 with container 10 can be adjusted and fixed. The fixing is preferably done by tightening along a direction R.

Likewise or alternatively, the bridging portions 324, 344 can be configured such that their characteristics, in particular as regards their elasticity and/or resilience, can be changed, for example, by twisting and/or wrapping.

Figure 10A:
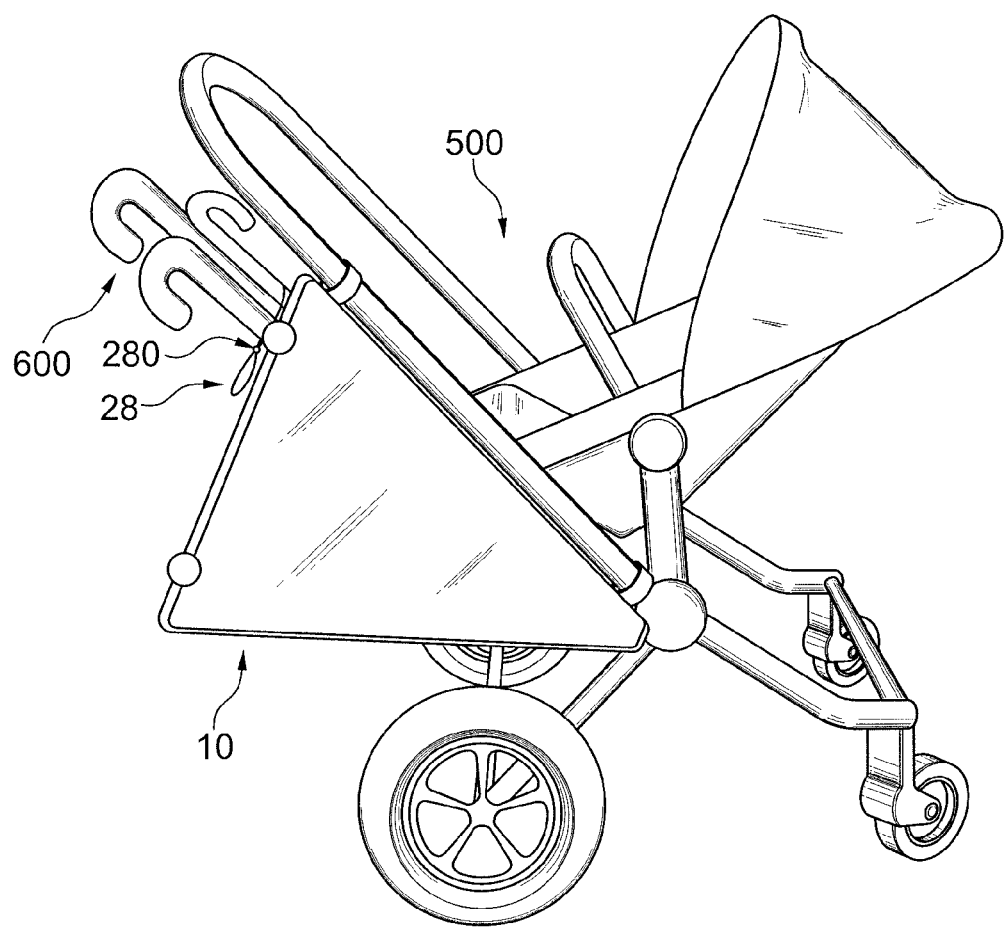
Figure 10B:
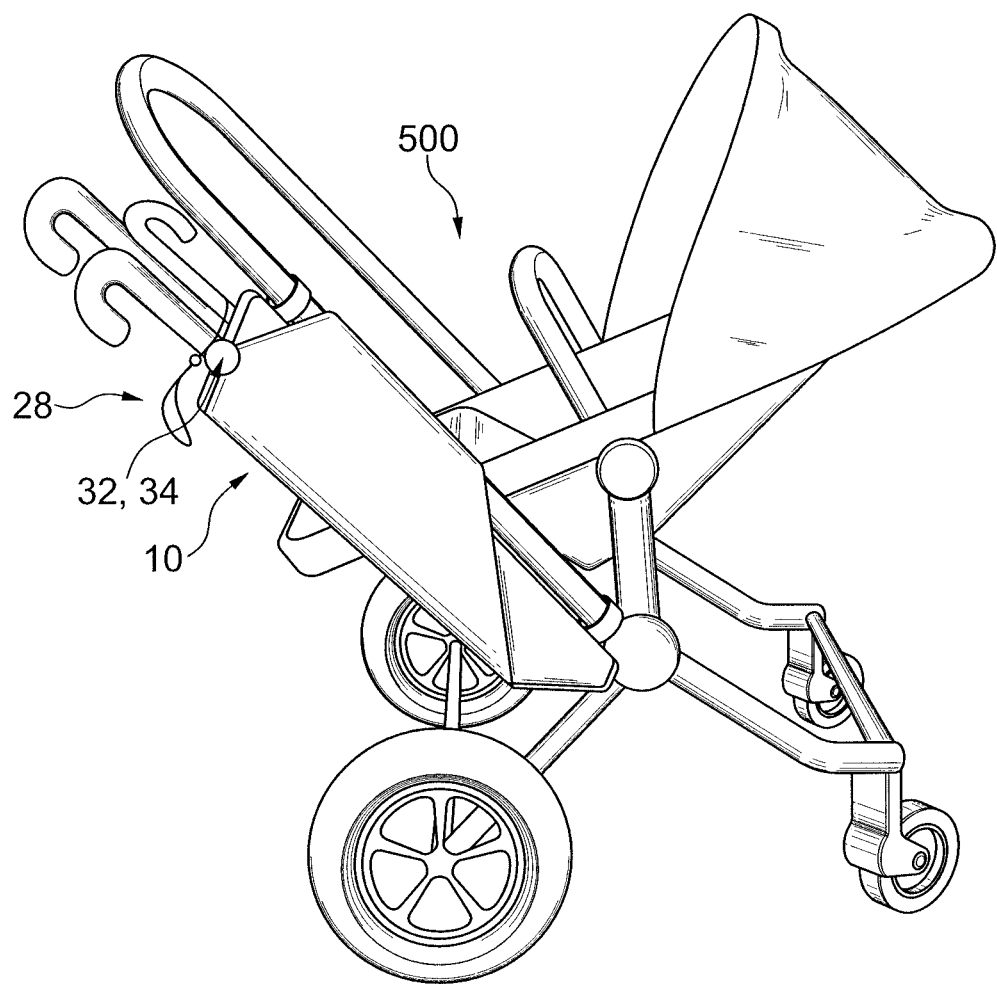
Figure 10C:
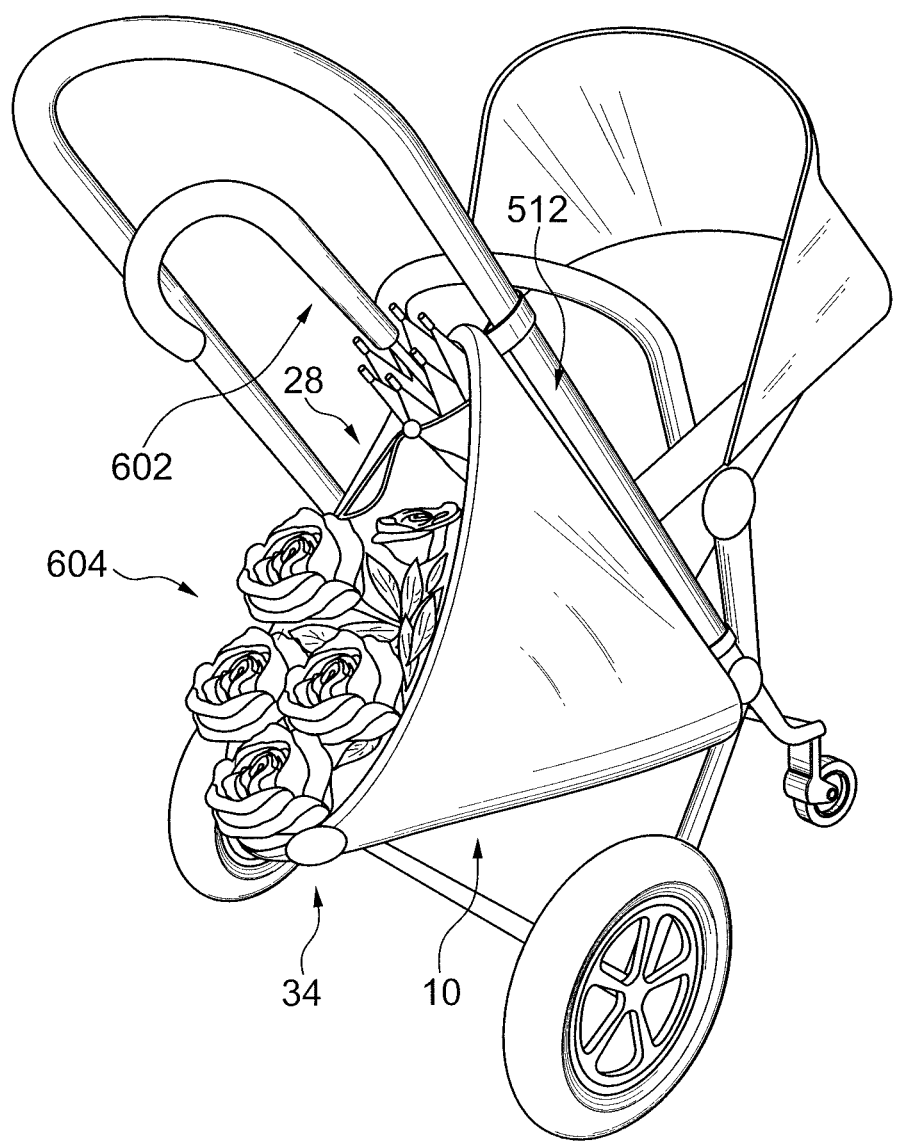

FIGS. 10a and 10b essentially show a container 10 in connection with a stroller having the characteristics described above. Additionally, FIGS. 10a and 10b show a loop element 28, as described above, and further elongate objects, here three hockey sticks 600. According to a particularly preferred embodiment, these may also protrude from a second lower container opening (not shown). Container 10 comprises loop element 28, as described above. By means of adjusting element 280 it is possible to additionally fix the hockey sticks 600. According to FIG. 10b, container 10 including the hockey sticks may be wrapped around a longitudinal axis, and engaging elements 32, 34 can be brought into engagement with each other. In this way, a practicable means of transport is provided on stroller 500. According to FIG. 10c, the container 10 can also be used for carrying different and heterogeneous objects. Thus, it is possible to carry an umbrella 602 and roses 604 at the same time. In the configuration of the embodiment shown in FIG. 10c, the engaging element 34 (32 not shown) are not in engagement with each other, but are in engagement with their corresponding elements. Therefore, they are in a "resting state". Container 10 is not wrapped around its own axis either, so that it has a relatively large volume. Umbrella 602 is accommodated in an "upper" portion of the inside of the container, i.e. in an upper angular portion, i.e. in a portion close to and/or substantially in parallel to stroller rod 512. In this portion, it is fixed by loop element or fixing element 28. On the other hand, roses, or rather, more generally, flowers, and/or delicate objects 604, are placed in a lower portion, i.e. in a lower angular portion of container 10.

Figure 11A:
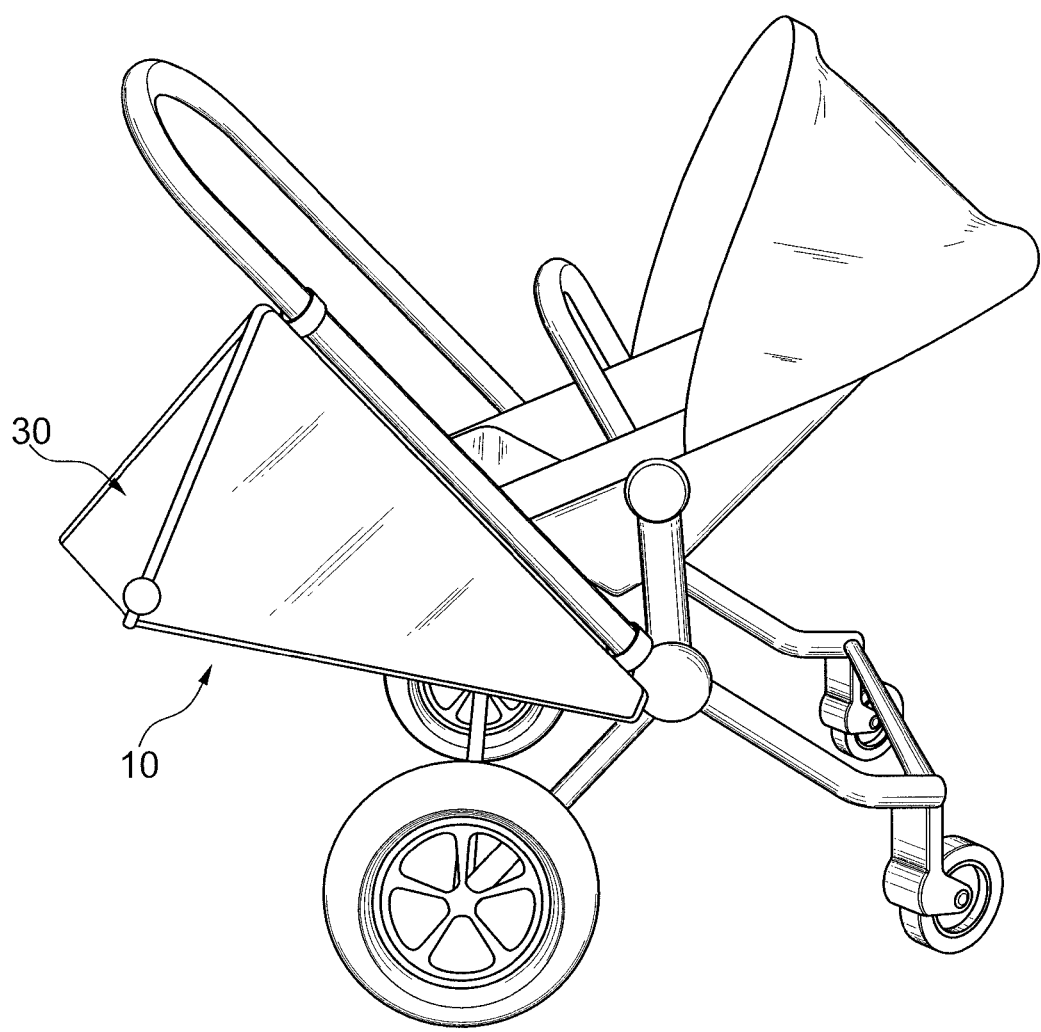
Figure 11B:
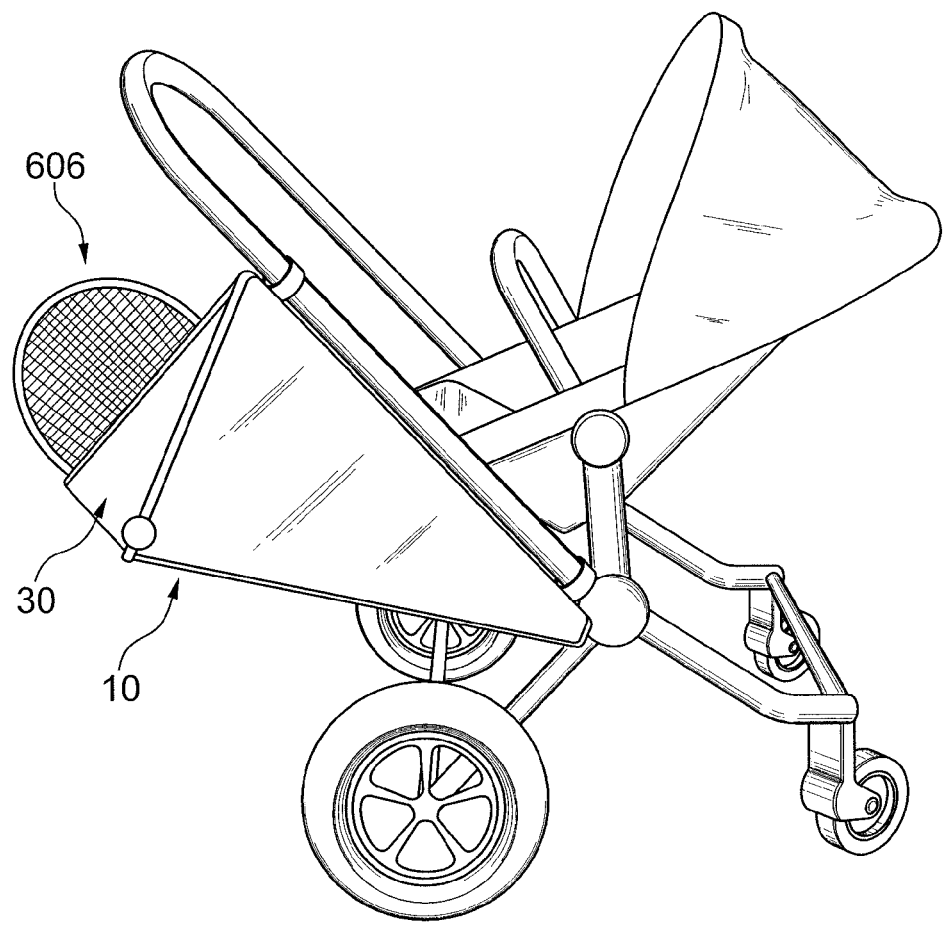
Figure 11C:
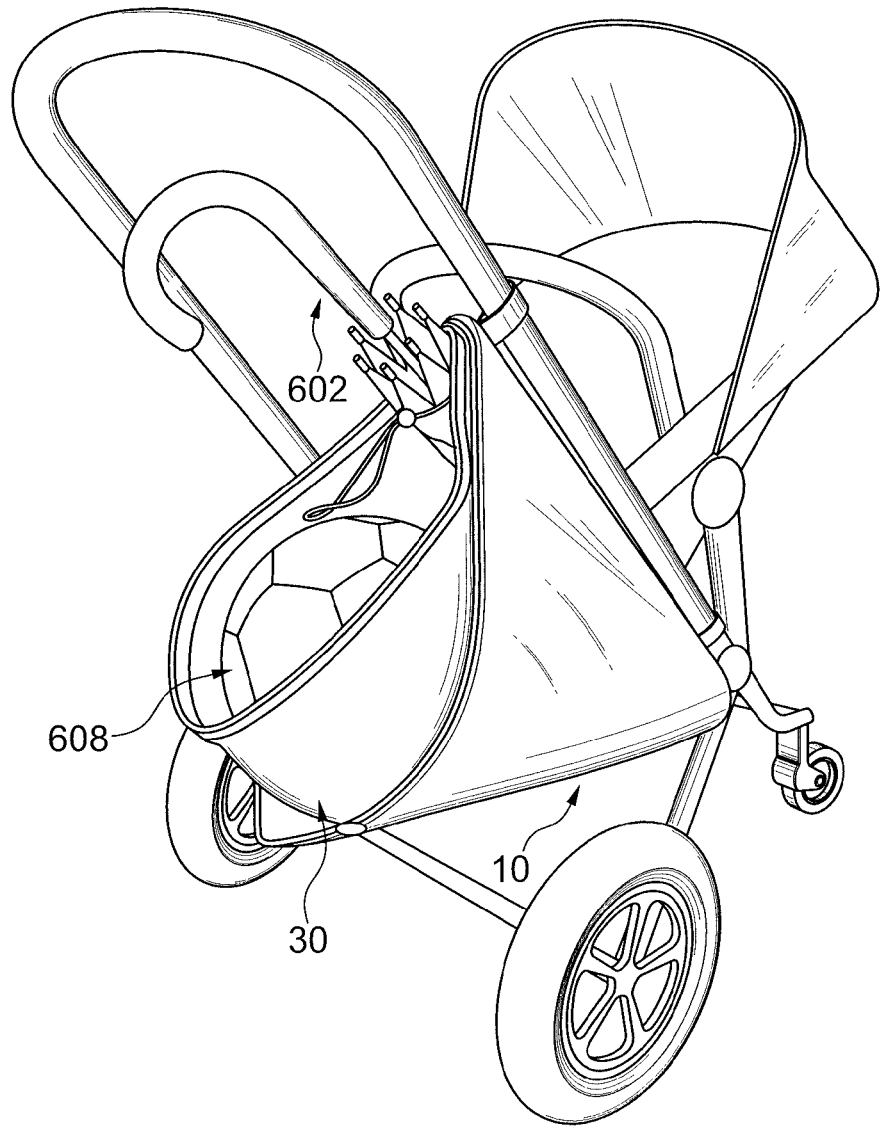

The embodiment shown in FIG. 11a essentially comprises the features of the embodiment shown in FIG. 8 (with regard to these features, reference is made to the respective discussion of FIG. 8). In addition, the embodiment depicted in FIG. 11a comprises a collar portion 30 which can be configured as described above. By the provision of such collar portion 30 according to FIG. 11b it is possible to easily and practically carry, for example, unhandy and/or bulky objects, such as ball sport rackets, preferably badminton, squash and/or tennis rackets 606, and prevent them from dropping out. Furthermore, it is possible to transport different and heterogeneous objects in a particularly simple, safe and practicable manner, as shown for example in FIG. 11c, where container 10 accommodates, on the one hand, an elongate object, namely an umbrella 602, and on the other hand, a round object, namely a ball, preferably a soccer ball 608. The above described embodiments, such as those shown in FIGS. 8 to 10, may likewise comprise preferred collar portions, as initially described. However, these can be folded up and/or folded down.

Figure 12:
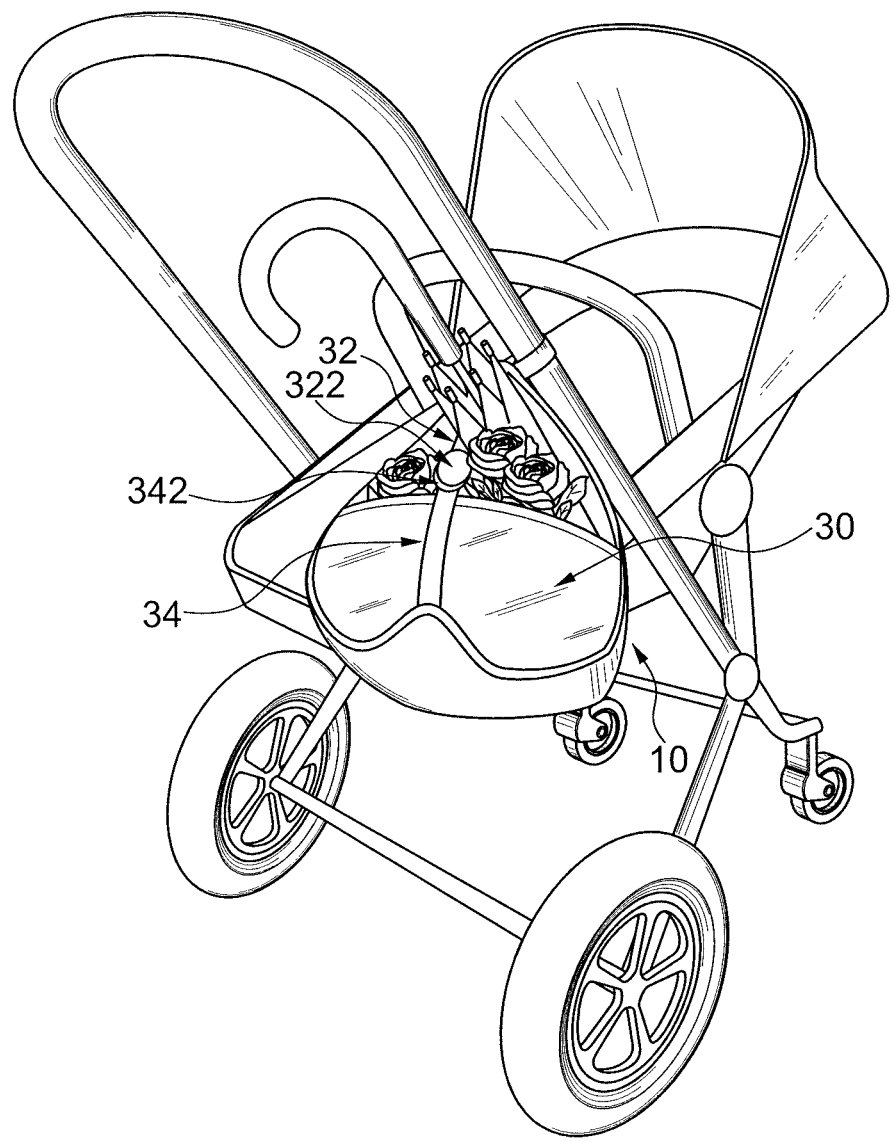
Figure 13:
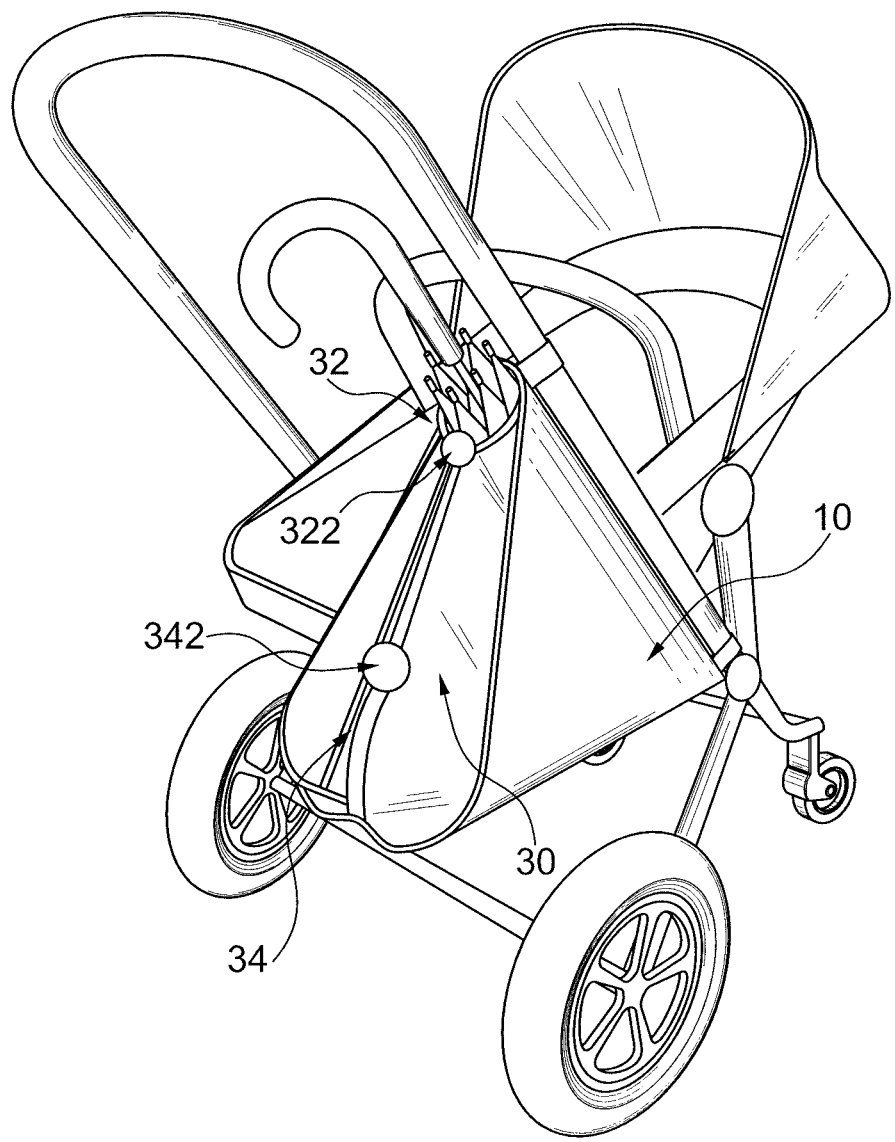

Furthermore, according to FIG. 12 it is also preferred that engaging elements 34 and 32 are configured to be brought into engagement with each other without that there is folding or wrapping along a longitudinal axis of the container 10. In the depicted configuration of the depicted embodiment, engaging elements 34 and 32 are brought into engagement with each other in such a way that they change the shape of the first container opening. Engaging elements 34, 32 are in engagement with each other by means of their engagement portions 342, 322. The size of the container opening or of an opening of the collar portion 30 is preferably changed, and preferably reduced, in a direction perpendicular to the horizontal, i.e. perpendicular to the bottom surface or essentially in parallel to the force of gravity. This changes the angular extension of container 10, preferably in such a way that it becomes even more difficult for objects to drop out of container 10 through the first container opening or the opening of the collar portion 30. Likewise or alternatively, according to FIG. 13 it is also possible that engagement elements 32 and 34 are in engagement with a boundary of collar portion 30 by means of their engagement portions 322 and/or 342 and accessory engaging elements (not shown in FIG. 13), thus limiting an opening of the container 10 and/or of the collar portion 30. In this way it is also possible to further protect objects accommodated in container 10 against external influences, such as moisture, rain, sun and/or dirt.

Figure 14:
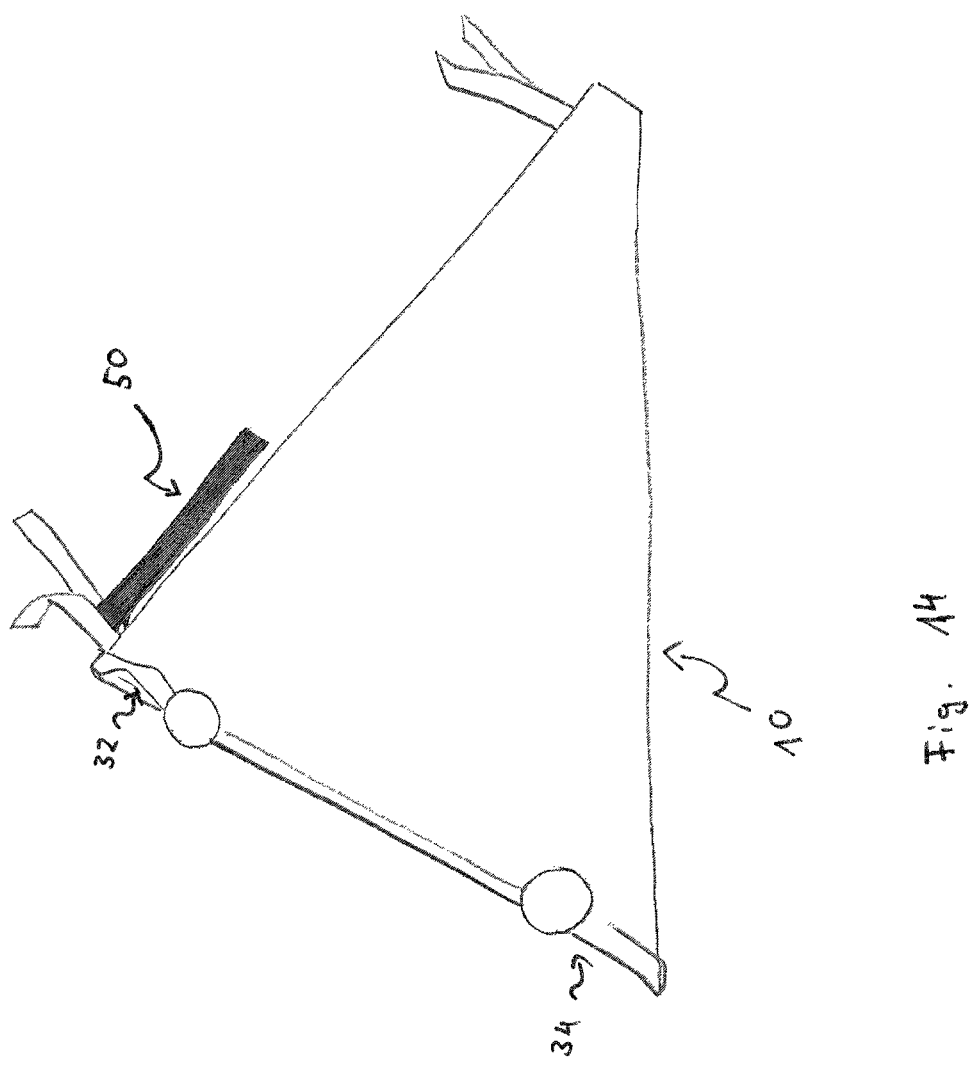
FIG. 14 is a schematic top view of a further embodiment of a container according to the invention.

According to FIG. 14 it is preferred that container 10 comprises an additional fixing element 50 which is configured for engagement with at least one of the engaging elements 32, 34. According to FIG. 15, fixing element 50 may be adapted such that it can be arranged at a portion 220 of mounting element 22 and brought into engagement therewith. It is also preferred that fixing element 50 comprises hooks and/or loops so that it is possible to bring it into engagement with at least one of the engaging elements 32, 34. Preferably, the fixing element comprises an end portion 52 having a loop through which it is possible to pass a portion 220 of the mounting element 22. Preferably, a length of the fixing element 50 is about a third of the length of the container 10 in longitudinal direction, and preferably between 10% and 50% of the length of container 10 in longitudinal direction. Moreover, fixing element 10 may comprise relatively flexible material, such as woven material.

Figure 15:
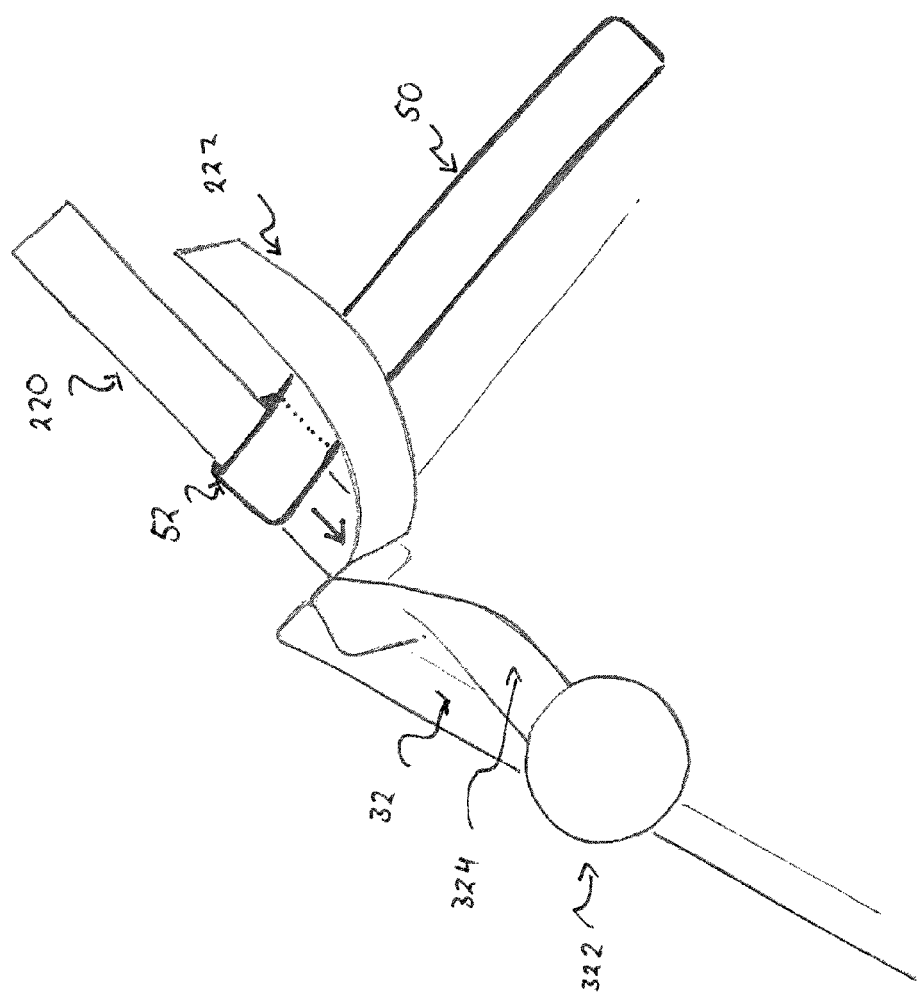
FIG. 15 is an enlarged partial view of the container from FIG. 14.
Figure 16:
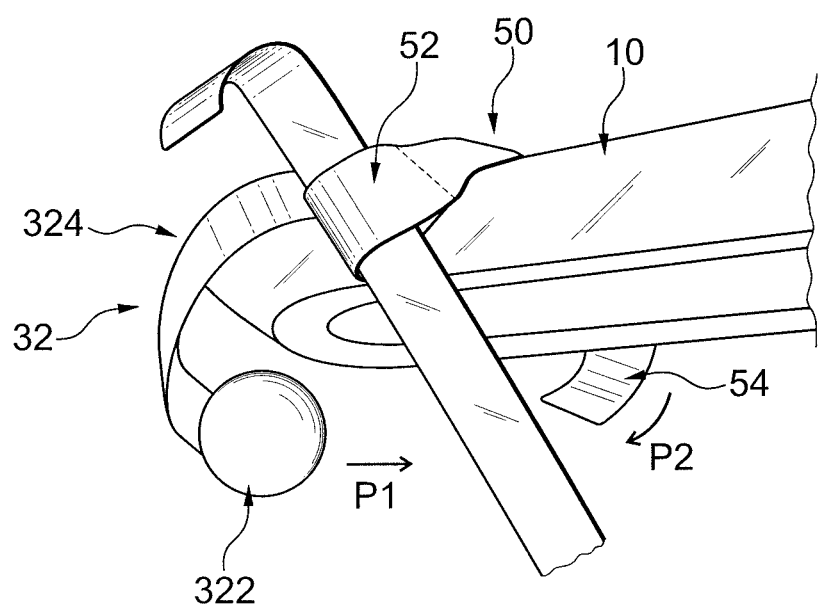
FIG. 16-18 is a schematic partial top views of further configurations of the container shown in FIG. 14.
Figure 19:
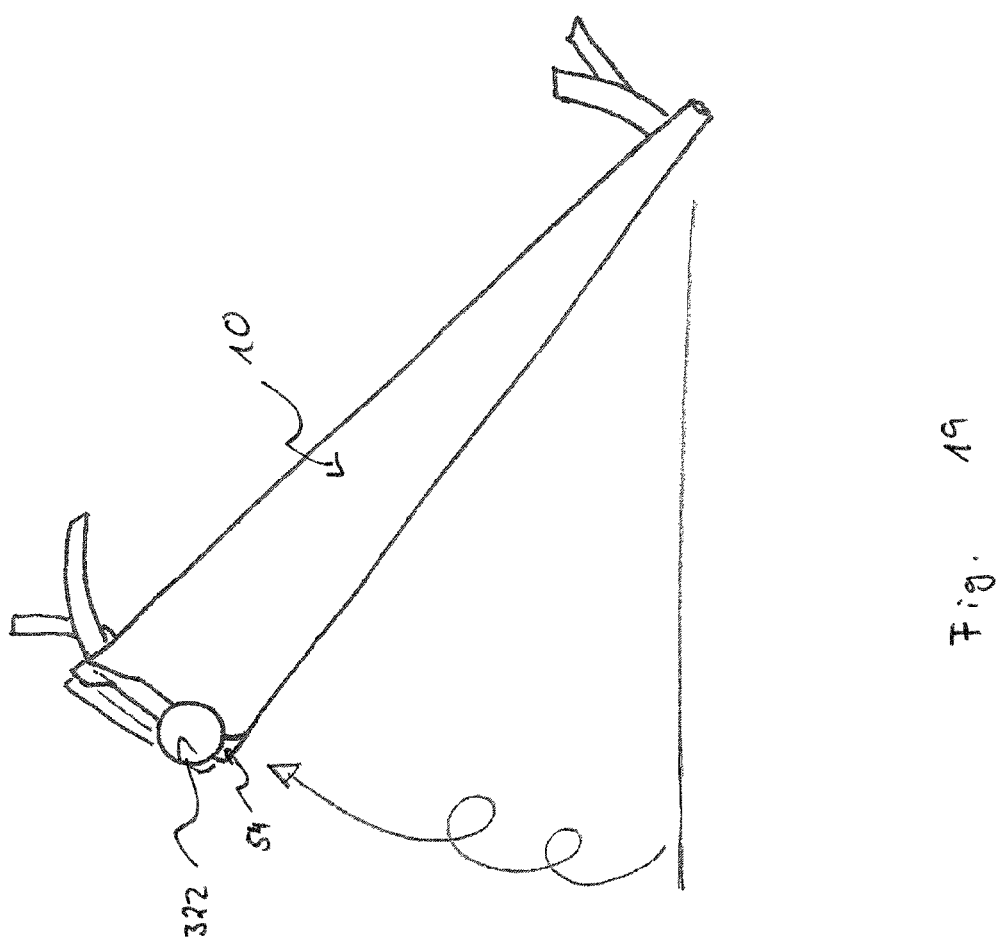
FIG. 19 is a schematic top view of a further configuration of the embodiment of a container according to the invention shown in FIG. 14.
Figure 20:
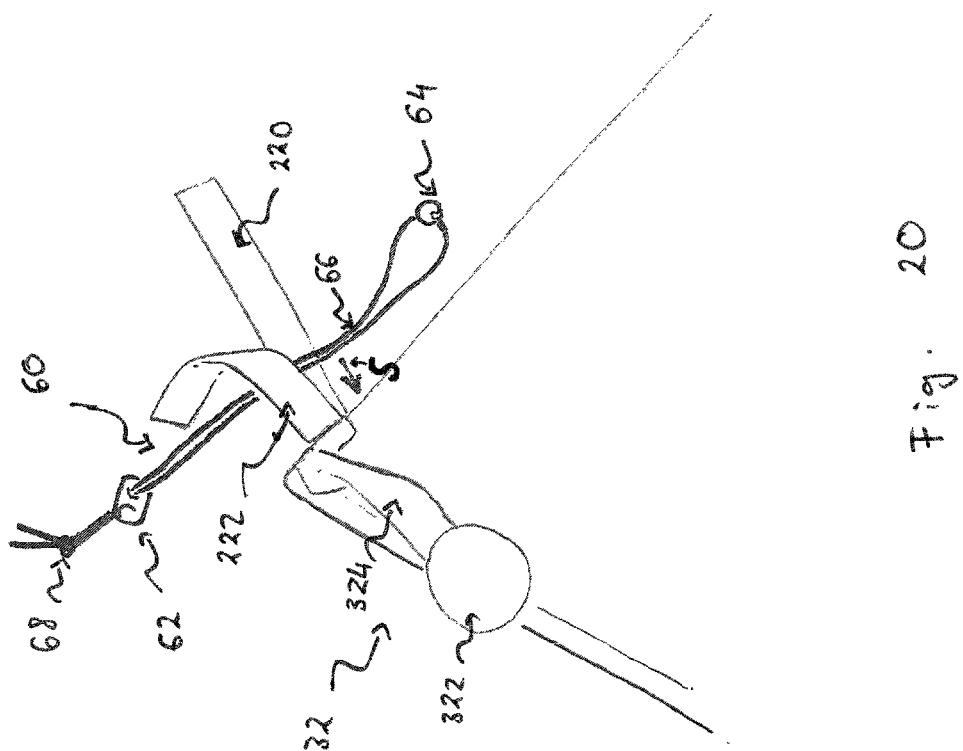
FIG. 20 is an enlarged partial view of a further embodiment of the container according to the invention.

According to FIG. 16, a container 10, as shown for example in FIGS. 14 and 15, can be wrapped around a longitudinal axis one or more times. This is also shown by the spiral arrow in FIG. 19. Moreover, it is likewise possible to squeeze, crumple, wrinkle, crease or rumple container 10 in a direction essentially perpendicular to a longitudinal direction. Both by wrapping and by reducing its size by crumpling and the like, an end portion 54 can be brought into engagement with the engagement portion 322 of engaging element 32. The skilled person will know that this can also be analogously applied to the engagement portion 342 of engaging element 34. The bringing-into-engagement is indicated in FIG. 16 by arrows P1 and P2.

Figure 17:
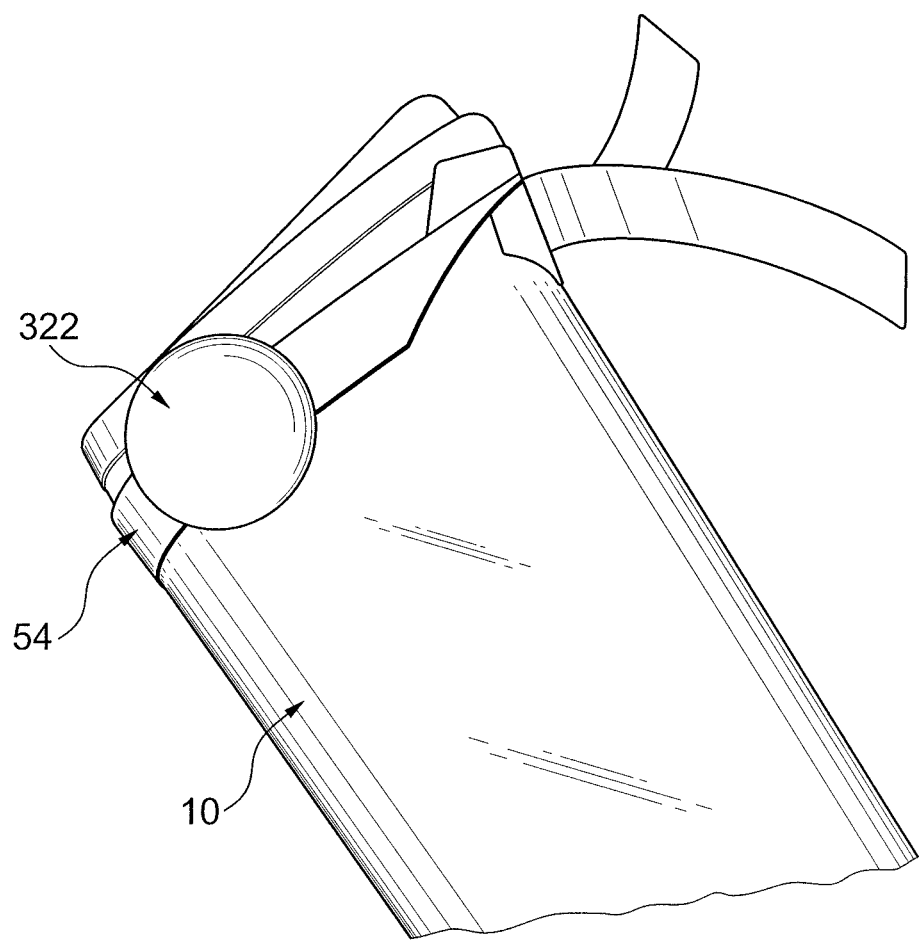
Figure 18:
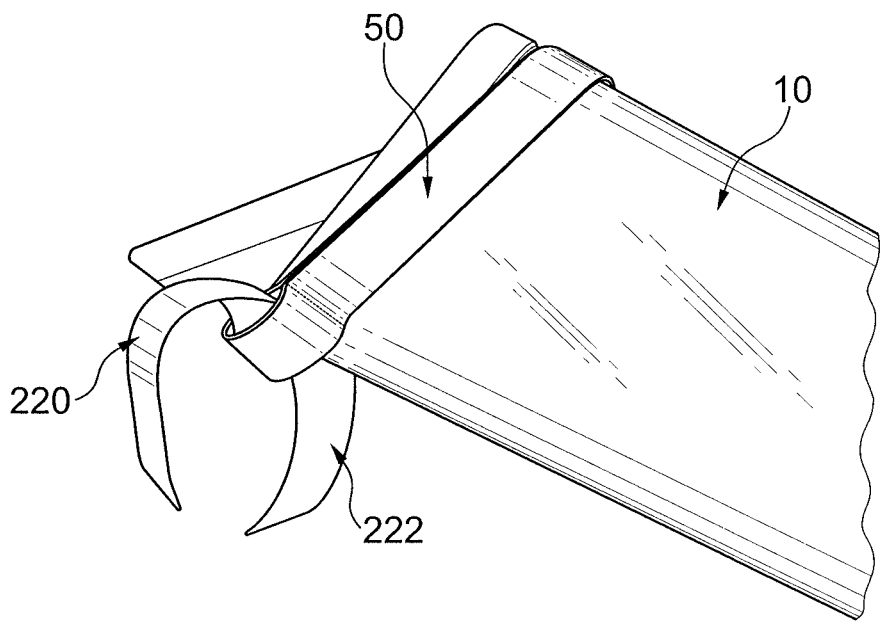

FIG. 17 shows a first top view of a container 10 in which an end portion 54 of fixing element 50 is in engagement with an engagement portion 322 of engaging element 32. Preferably, this can be realized by engagement portion 322 having loops or hooks, and end portion 54 having the corresponding elements, that is hooks and loops, respectively. FIG. 18 shows a second top view of a container 10, as shown in FIG. 17, with this top view being essentially opposite to the one shown in FIG. 17.

Alternatively, the fixing element can also be realized in the form of a loop element 60. Such a loop element preferably comprises a loop 66, which particularly preferably is elastic. Loop 66 can also be formed from a strap and by providing a knot 68 form a loop. Furthermore, loop element 60 preferably comprises a loop adjustment element 62 separating the loop element 60 into two sub-loops, and further a stopping element 64 which is configured for preventing detachment of the adjustment element 62 from loop element 60. Such a loop element is preferably introduced between portions 220 and 222 of the mounting element 22. In use, it may also be limited by these portions and additionally by a rod 512 of a stroller. Moreover, loop element 60 is preferably configured to enclose an outer surface of a container 10 in the wrapped and/or collapsed state (such as folded, squeezed, creased, wrinkled or crumpled), thereby fixing the size of container 10.

Figure 21:
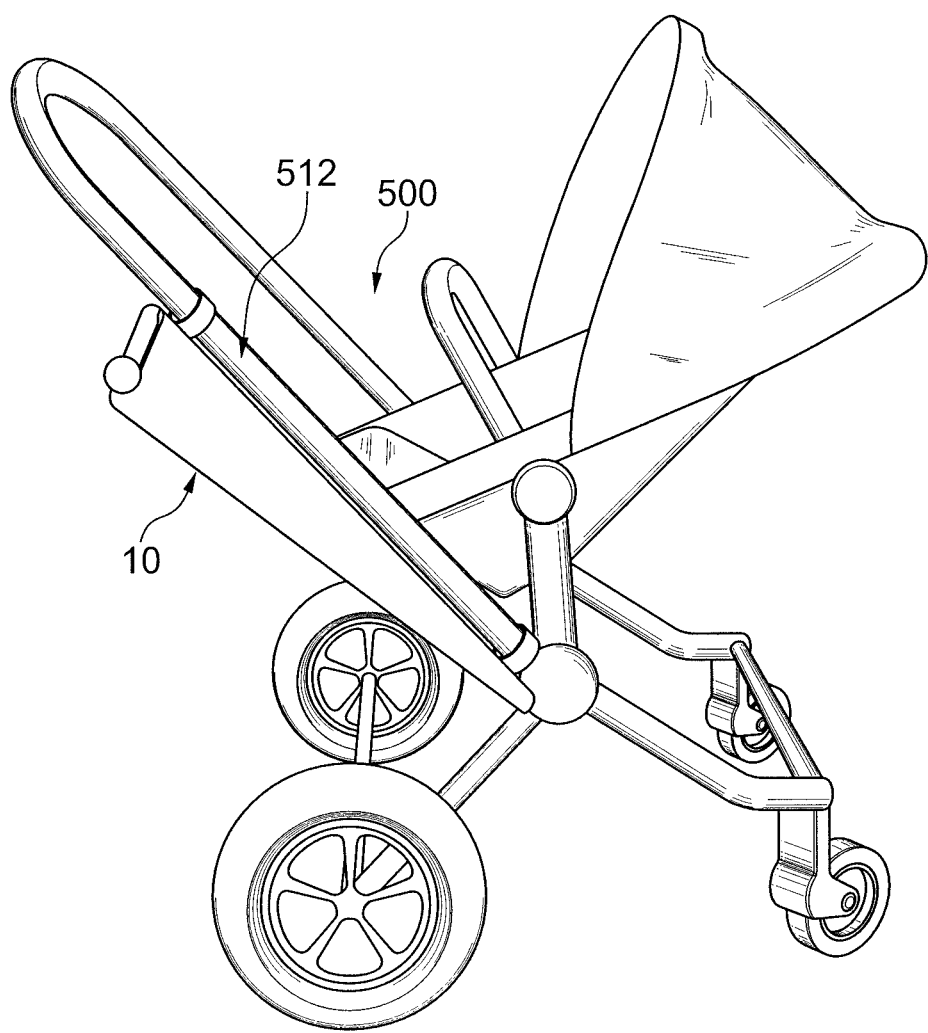
FIG. 21 is a perspective view of a system comprising a stroller and a container according to an embodiment of the present invention.

According to FIG. 21, the provision of such fixing elements 50 and/or loop elements 60 can be suitable for holding and/or fixing a container 10 which is wrapped around a longitudinal axis or otherwise collapsed without it being necessary that the container is at least partly wrapped around a rod 512.

With the container according to the present invention and its described preferred embodiments, a novel system is provided that considerably facilitates the transport of elongate objects, in particular, on strollers, and makes this transport more practicable and safe. In particular, with such a container and/or a system comprising such a container and a stroller it is possible to transport objects without that they swing around during transport.

Although the invention has been described above with respect to specific embodiments, the skilled person will know that he can omit, or combine with each other, individual elements and features of the various described embodiments. Moreover, the skilled person likewise knows that the described embodiments are merely intended to clarify and exemplify the described invention, and not suitable to limit the scope of protection. The scope of protection is defined by the attached claims. However, the skilled person also knows that equivalent embodiments likewise fall under the scope of protection.

When in the present disclosure expressions like "about", "approximately", "circa", "essentially", "substantially", "in general", "at least", etc. are used, these are meant to also comprise the respective exact expressions, features, numerical values or ranges, etc. Thus, the expression "approximately 3" shall also comprise "exactly 3", and an expression, such as "substantially frustum shaped" shall also comprise "frustum shaped".

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A container for receiving and carrying elongate objects, the container comprising:
   a container cladding having an inner surface and an outer surface;
   a first container opening on one end of the container cladding; and
   one or more mounting elements for mounting the container to a stroller, the mounting elements being arranged at a portion of the outer surface of the container, wherein the container has substantially a shape of a cornet and has an angular extension of approximately 20° to 55°.

2. The container according to claim 1, wherein the container and the mounting elements are adapted for mounting the container to a rod of a stroller, with said rod forming in normal use an angle with the horizontal from 20° to 70°, from 30° to 60°, from 35° to 55°, or from 40° to 50°, wherein the container is adapted to be mounted to the rod such that, in a top view perpendicular to a longitudinal axis, the container together with a horizontal covers an angular range which is a partial of the angular range from −5° and the angle between the horizontal and the stroller rod, with the algebraic sign of angle being defined such that the angle between the horizontal and the rod of the stroller is positive, and wherein the container is adapted to be mounted to the rod such that the first opening is mounted on a side on which the stroller comprises a push handle.

3. The container according to claim 1, further comprising an additional supporting rod, which is arranged on an inner surface of the container such that, when the container is mounted to a rod of the stroller, the supporting rod extends substantially in parallel to said rod and at least over a major part of a longitudinal direction of the container cladding.

4. The container according to claim 1 further comprising a loop in the first container opening, which allows fixing of the elongate objects.

5. The container according to claim 4, wherein a ratio of a circumference of the container opening and a circumference of the loop is from 1 to 6, from 1.5 to 5, from 2 to 4, or from 2.5 to 3.5.

6. The container according to claim 1, further comprising a second container opening on one end of the container cladding opposite to the end of the first container opening.

7. The container according to claim 6, wherein the second container opening is adapted for channeling off liquids and/or for putting elongate object therethrough.

8. The container according to claim 1 further comprising a collar portion which is configured to be folded up and out, and which in the fold-up state is circumferentially surrounded by the container cladding, and in the fold-out state tapers with increasing distance from the container cladding, and, close to the cladding portion, has a larger circumference than further away from it.

9. The container according to claim 1, wherein the container is adapted to be folded and/or wrapped along a longitudinal axis, and is adapted to being kept in the folded and/or wrapped state via one or more retaining elements.

10. The container according to claim 9, wherein the retaining elements comprise two engaging elements which are mounted to opposite ends of the first container opening and which are adapted to be engaged with each other when the container is folded and/or wrapped along a longitudinal direction.

11. The container according to claim 1, wherein an internal volume of the container is adaptable.

12. The container according to claim 1, wherein the container cladding has a length of from 0.25 m to 1 m, from 0.3 m to 0.7 m, from 0.3 m to 0.6 m, or from 0.35 to 0.55 m.

13. The container according claim 1, wherein the first container opening comprises a circumference from 0.5 m to 1.3 m, from 0.6 m to 1.2 m, from 0.7 m to 1.1 m, or from 0.8 m to 1.0 m.

14. The container according to claim 1, wherein the container is adapted to receive and carry long objects and/or round and bulky objects.

15. A system comprising the stroller and the container according to claim 1.

* * * * *